United States Patent
Manolakos et al.

(10) Patent No.: US 12,470,256 B2
(45) Date of Patent: Nov. 11, 2025

(54) DOPPLER COMPENSATION CAPABILITY SIGNALING IN WIRELESS COMMUNICATIONS

(71) Applicant: QUALCOMM Incorporated, San Diego, CA (US)

(72) Inventors: Alexandros Manolakos, Escondido, CA (US); Muhammad Sayed Khairy Abdelghaffar, San Jose, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 375 days.

(21) Appl. No.: 17/999,698

(22) PCT Filed: Jul. 10, 2020

(86) PCT No.: PCT/CN2020/101397
§ 371 (c)(1),
(2) Date: Nov. 22, 2022

(87) PCT Pub. No.: WO2022/006868
PCT Pub. Date: Jan. 13, 2022

(65) Prior Publication Data
US 2023/0216546 A1 Jul. 6, 2023

(51) Int. Cl.
*H04B 7/01* (2006.01)
*H04L 5/00* (2006.01)

(52) U.S. Cl.
CPC ............ *H04B 7/01* (2013.01); *H04L 5/0048* (2013.01)

(58) Field of Classification Search
CPC .................. H04B 7/01; H04L 5/0048
See application file for complete search history.

(56) References Cited

U.S. PATENT DOCUMENTS

| 11,943,043 | B2* | 3/2024 | Wang | H04W 24/02 |
| 2015/0372722 | A1 | 12/2015 | Siwiak | |

(Continued)

FOREIGN PATENT DOCUMENTS

| CN | 102783213 A | 11/2012 |
| CN | 108476057 A | 8/2018 |

(Continued)

OTHER PUBLICATIONS

CATT: "Views on NTN WI in Rel-17", RP-192866, 3GPP TSG-RAN Meeting #86, Sitges, Spain, Dec. 9-12, 2019, Dec. 12, 2019 (Dec. 12, 2019) the Whole Document, 3 Pages.

(Continued)

*Primary Examiner* — Jay P Patel
(74) *Attorney, Agent, or Firm* — Holland & Hart LLP/Qualcomm Incorporated

(57) ABSTRACT

Methods, systems, and devices for wireless communications are described in which user equipment (UE) may provide a capability indication to one or multiple transmission reception points (TRPs) that indicates whether the UE is capable of performing Doppler pre-compensation. One or more of the TRPs may transmit configuration information to the UE to configure Doppler pre-compensation for subsequent communications. The UE may indicate that multiple Doppler shifts for a single communication with multiple TRPs is supported, or that a single Doppler shift or no Doppler shift is supported. The UE, when Doppler pre-compensation is supported and configured, may estimate one or more Doppler metrics (e.g., a Doppler shift, a maximum Doppler spread, or both) for one or multiple TRPs based on one or more reference signals from the TRPs, and may transmit one or more uplink communications based on the estimated Doppler metrics.

35 Claims, 18 Drawing Sheets

(56) References Cited

U.S. PATENT DOCUMENTS

| | | | |
|---|---|---|---|
| 2018/0323918 A1* | 11/2018 | Chuang | H04W 72/044 |
| 2019/0341989 A1 | 11/2019 | Raghavan et al. | |
| 2021/0320823 A1* | 10/2021 | Ernström | H04L 25/0212 |
| 2021/0359752 A1* | 11/2021 | Wang | H04W 24/02 |
| 2022/0312500 A1* | 9/2022 | Cao | H04W 74/0841 |
| 2023/0054715 A1* | 2/2023 | Li | H04B 7/1855 |
| 2023/0163928 A1* | 5/2023 | Abdelghaffar | H04L 5/0091 370/329 |

FOREIGN PATENT DOCUMENTS

| | | |
|---|---|---|
| EP | 3567778 A1 | 11/2019 |
| WO | WO-2020064878 A1 | 4/2020 |

OTHER PUBLICATIONS

International Search Report and Written Opinion—PCT/CN2020/101397—ISA/EPO—Apr. 9, 2021.

Samsung: "Discussion on Beam Indication for PDSCH", 3GPP TSG RAN WG1 Meeting #90, 3GPP Draft, R1-1714513, 3rd Generation Partnership Project (3GPP), Mobile Competence Centre, 650, Route Des Lucioles, F-06921 Sophia-Antipolis Cedex, France, vol. RAN WG1, No. Prague, Czech, Jun. 21, 2017-Jun. 25, 2017, Aug. 20, 2017 (Aug. 20, 2017), 4 Pages, XP051317288, Section 2, Chapter 2 and Chapter 3, Section 2-3, the Whole Document.

* cited by examiner

DOPPLER COMPENSATION CAPABILITY SIGNALING IN WIRELESS COMMUNICATIONS

CROSS REFERENCE

The present application is a 371 national stage filing of International PCT Application No. PCT/CN2020/101397 by MANOLAKOS et al. entitled "DOPPLER COMPENSATION CAPABILITY SIGNALING IN WIRELESS COMMUNICATIONS," filed Jul. 10, 2020, which is assigned to the assignee hereof, and which is expressly incorporated by reference in its entirety herein.

FIELD OF TECHNOLOGY

The following relates generally to wireless communications and more specifically to doppler compensation capability signaling in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support capability indications and configuration for Doppler pre-compensation in wireless communications with one or more transmission reception points (TRPs). Various aspects of the described techniques provide for compensating for a Doppler shift associated with communications between one or more TRPs and a user equipment (UE). A UE may provide a capability indication to a TRP that indicates whether the UE is capable of performing Doppler pre-compensation. Responsive to the capability indication, one or more of the TRPs may transmit configuration information to the UE to configure Doppler pre-compensation. In some cases, the UE may indicate that multiple Doppler shifts for a single communication with multiple TRPs is supported. In other cases, the UE may indicate that a single Doppler shift is supported, or may indicate that no Doppler shift is supported. The UE, when Doppler pre-compensation is supported and configured, may estimate one or more Doppler metrics (e.g., a Doppler shift, a maximum Doppler spread, or both) for one or multiple TRPs based on one or more reference signals from the TRPs (e.g., tracking reference signals (TRSs), synchronization signal block (SSB) transmissions, channel state information-reference signals (CSI-RSs)). The UE may transmit one or more uplink communications based on the estimated Doppler metrics. In some cases, the TRP may provide an indication to the UE that indicates whether uplink or downlink communications are Doppler pre-compensated, and the UE may select a transmission configuration indicator (TCI) state and associated quasi-co-location (QCL) relation based on the indication of Doppler pre-compensation.

A method of wireless communication at a UE is described. The method may include transmitting a Doppler compensation capability indication to a first transmission-reception point of two or more transmission-reception points that are in communication with the UE, where the Doppler compensation capability indication signals one or more capabilities of the UE for Doppler pre-compensating one or more uplink communications to one or more of the first transmission-reception point or a second transmission-reception point, receiving, from one or more of the first transmission-reception point or the second transmission-reception point, control information for at least a first uplink communication to be transmitted from the UE to one or more of the first transmission-reception point or the second transmission-reception point based on the Doppler compensation capability indication, and transmitting the first uplink communication to one or more of the first transmission-reception point or the second transmission-reception point based on the control information.

An apparatus for wireless communication at a UE is described. The apparatus may include a processor, memory coupled with the processor, and instructions stored in the memory. The instructions may be executable by the processor to cause the apparatus to transmit a Doppler compensation capability indication to a first transmission-reception point of two or more transmission-reception points that are in communication with the UE, where the Doppler compensation capability indication signals one or more capabilities of the UE for Doppler pre-compensating one or more uplink communications to one or more of the first transmission-reception point or a second transmission-reception point, receive, from one or more of the first transmission-reception point or the second transmission-reception point, control information for at least a first uplink communication to be transmitted from the UE to one or more of the first transmission-reception point or the second transmission-reception point based on the Doppler compensation capability indication, and transmit the first uplink communication to one or more of the first transmission-reception point or the second transmission-reception point based on the control information.

Another apparatus for wireless communication at a UE is described. The apparatus may include means for transmitting a Doppler compensation capability indication to a first transmission-reception point of two or more transmission-reception points that are in communication with the UE, where the Doppler compensation capability indication signals one or more capabilities of the UE for Doppler pre-compensating one or more uplink communications to one or more of the first transmission-reception point or a second transmission-reception point, receiving, from one or more of the first transmission-reception point or the second transmission-reception point, control information for at least a first uplink communication to be transmitted from the UE to one or more of the first transmission-reception point or the second transmission-reception point based on the Doppler compensation capability indication, and transmitting the first uplink communication to one or more of the first transmission-reception point or the second transmission-reception point based on the control information.

A non-transitory computer-readable medium storing code for wireless communication at a UE is described. The code may include instructions executable by a processor to transmit a Doppler compensation capability indication to a first transmission-reception point of two or more transmission-reception points that are in communication with the UE, where the Doppler compensation capability indication signals one or more capabilities of the UE for Doppler pre-compensating one or more uplink communications to one or more of the first transmission-reception point or a second transmission-reception point, receive, from one or more of the first transmission-reception point or the second transmission-reception point, control information for at least a first uplink communication to be transmitted from the UE to one or more of the first transmission-reception point or the second transmission-reception point based on the Doppler compensation capability indication, and transmit the first uplink communication to one or more of the first transmission-reception point or the second transmission-reception point based on the control information.

In some examples of the method, apparatuses, and non-transitory computer-readable medium described herein, the receiving the control information further may include operations, features, means, or instructions for receiving, from one or more of the first transmission-reception point or the second transmission-reception point, configuration information that enables the UE to perform a carrier frequency offset compensation for at least the first uplink communication based on an estimation of Doppler shift associated with one or more of the first transmission-reception point or the second transmission-reception point.

In some examples of the method, apparatuses, and non-transitory computer-readable medium described herein, the transmitting the Doppler compensation capability indication may include operations, features, means, or instructions for transmitting one or more of a capability indication for Doppler pre-compensating one or more frequency bands, a capability indication for Doppler pre-compensating one or more combinations of frequency bands, a capability indication for Doppler pre-compensating one or more high band or low band frequency ranges, or any combinations thereof. In some examples of the method, apparatuses, and non-transitory computer-readable medium described herein, the Doppler compensation capability indication indicates that the UE supports multiple concurrent Doppler pre-compensations for multiple transmission-reception points, a number of concurrent Doppler pre-compensations that may be supported by the UE, whether the capability may be per component carrier or across component carriers, or per band or across a band combination, or per UE, or any combinations thereof.

Some examples of the method, apparatuses, and non-transitory computer-readable medium described herein may further include operations, features, means, or instructions for estimating a first Doppler shift associated with the first transmission-reception point and a second Doppler shift associated with the second transmission-reception point, and determining, based on the estimating, a first carrier frequency offset for the first transmission-reception point and a second carrier frequency offset for the second transmission-reception point, and where the first uplink communication is compensated based on the first carrier frequency offset and the second carrier frequency offset. In some examples of the method, apparatuses, and non-transitory computer-readable medium described herein, the Doppler compensation capability indication further indicates that the UE supports receiving multiple downlink reference signals from the multiple transmission-reception points that are associated with a same uplink reference signal. In some examples of the method, apparatuses, and non-transitory computer-readable medium described herein, the first uplink communication includes one or more of a sounding reference signal, an uplink control channel communication, an uplink shared channel communication, an uplink random access channel communication, or any combinations thereof. Some examples of the method, apparatuses, and non-transitory computer-readable medium described herein may further include operations, features, means, or instructions for configuring a first transmission configuration indicator state associated with the first transmission-reception point, and a second transmission configuration indicator state associated with the second transmission-reception point based on the control information, and where the first uplink communication is transmitted based on the first transmission configuration indicator state and the second transmission configuration indicator state.

In some examples of the method, apparatuses, and non-transitory computer-readable medium described herein, the Doppler compensation capability indication indicates that the UE supports a single Doppler pre-compensation for each uplink communication from the UE. Some examples of the method, apparatuses, and non-transitory computer-readable medium described herein may further include operations, features, means, or instructions for estimating a single Doppler shift associated with the first transmission-reception point and the second transmission-reception point, and determining, based on the estimating, a single carrier frequency offset that is to be applied to the first uplink communication. In some examples of the method, apparatuses, and non-transitory computer-readable medium described herein, the single carrier frequency offset may be determined based on one or more of an average doppler shift among at least the first transmission-reception point and the second transmission-reception point, or a linear estimation of weighted linear values for each transmission-reception point based on an associated downlink signal strength. Some examples of the method, apparatuses, and non-transitory computer-readable medium described herein may further include operations, features, means, or instructions for configuring a single transmission configuration indicator state associated with both the first transmission-reception point and the second transmission-reception point based on the control information, and where the first uplink communication is transmitted based on the single transmission configuration indicator state.

In some examples of the method, apparatuses, and non-transitory computer-readable medium described herein, the Doppler compensation capability indication indicates that Doppler pre-compensation may be unsupported by the UE. In some examples of the method, apparatuses, and non-transitory computer-readable medium described herein, the first uplink communication is not modulated to compensate for an estimated Doppler shift associated with the first transmission-reception point or the second transmission-reception point. In some examples of the method, apparatuses, and non-transitory computer-readable medium described herein, the first uplink communication includes an uplink reference signal that is not modulated to compensate for an estimated Doppler shift associated with the first transmission-reception point or the second transmission-reception point, and where one or more of an uplink control channel, uplink shared channel, or random access channel associated with the first uplink communication is compensated based on the estimated Doppler shift.

In some examples of the method, apparatuses, and non-transitory computer-readable medium described herein, the control information indicates that the UE is to use multiple concurrent Doppler pre-compensations for the first uplink communication, a single Doppler pre-compensation for the first uplink communication, or that no Doppler pre-compensation is to be used for the first uplink communication. In some examples of the method, apparatuses, and non-transitory computer-readable medium described herein, the control information may be provided in RRC signaling that enables or disables Doppler shift pre-compensation for uplink communications. In some examples of the method, apparatuses, and non-transitory computer-readable medium described herein, the control information may be provided in one or more of a downlink control information communication or a medium access control (MAC) control element enables or disables Doppler shift pre-compensation for at least the first uplink communication. In some examples of the method, apparatuses, and non-transitory computer-readable medium described herein, the control information provides an indication of Doppler shift pre-compensation based on one or more of a SRS resource that is mapped to Doppler shift pre-compensation, a SRS resource set that is mapped for Doppler shift pre-compensation, an uplink shared channel configuration, an uplink control channel configuration, one or more uplink bandwidth parts that are mapped for Doppler shift pre-compensation, one or more component carriers that are configured for Doppler shift pre-compensation, or any combinations thereof. In some examples of the method, apparatuses, and non-transitory computer-readable medium described herein, an indication of Doppler shift pre-compensation for the first uplink communication is determined based on a downlink reference signal that is received from one or more of the first transmission-reception point or the second transmission-reception point, and where the downlink reference signal is mapped to an indication of whether Doppler shift pre-compensation is to be applied for uplink communications associated with the downlink reference signal.

A method of wireless communication at a first transmission-reception point is described. The method may include receiving, from a UE, a Doppler compensation capability indication, where the Doppler compensation capability indication signals one or more capabilities of the UE for Doppler pre-compensating one or more uplink communications to one or more of the first transmission-reception point or a second transmission-reception point, transmitting, to the UE, control information for at least a first uplink communication to be transmitted from the UE to one or more of the first transmission-reception point or the second transmission-reception point based on the Doppler compensation capability indication, and receiving the first uplink communication from the UE based on the control information.

An apparatus for wireless communication at a first transmission-reception point is described. The apparatus may include a processor, memory coupled with the processor, and instructions stored in the memory. The instructions may be executable by the processor to cause the apparatus to receive, from a UE, a Doppler compensation capability indication, where the Doppler compensation capability indication signals one or more capabilities of the UE for Doppler pre-compensating one or more uplink communications to one or more of the first transmission-reception point or a second transmission-reception point, transmit, to the UE, control information for at least a first uplink communication to be transmitted from the UE to one or more of the first transmission-reception point or the second transmission-reception point based on the Doppler compensation capability indication, and receive the first uplink communication from the UE based on the control information.

Another apparatus for wireless communication at a first transmission-reception point is described. The apparatus may include means for receiving, from a UE, a Doppler compensation capability indication, where the Doppler compensation capability indication signals one or more capabilities of the UE for Doppler pre-compensating one or more uplink communications to one or more of the first transmission-reception point or a second transmission-reception point, transmitting, to the UE, control information for at least a first uplink communication to be transmitted from the UE to one or more of the first transmission-reception point or the second transmission-reception point based on the Doppler compensation capability indication, and receiving the first uplink communication from the UE based on the control information.

A non-transitory computer-readable medium storing code for wireless communication at a first transmission-reception point is described. The code may include instructions executable by a processor to receive, from a UE, a Doppler compensation capability indication, where the Doppler compensation capability indication signals one or more capabilities of the UE for Doppler pre-compensating one or more uplink communications to one or more of the first transmission-reception point or a second transmission-reception point, transmit, to the UE, control information for at least a first uplink communication to be transmitted from the UE to one or more of the first transmission-reception point or the second transmission-reception point based on the Doppler compensation capability indication, and receive the first uplink communication from the UE based on the control information.

In some examples of the method, apparatuses, and non-transitory computer-readable medium described herein, the transmitting the control information further may include operations, features, means, or instructions for transmitting configuration information that enables the UE to perform a carrier frequency offset compensation for at least the first uplink communication based on an estimation of Doppler shift associated with one or more of the first transmission-reception point or the second transmission-reception point. In some examples of the method, apparatuses, and non-transitory computer-readable medium described herein, the receiving the Doppler compensation capability indication may include operations, features, means, or instructions for receiving, from the UE, one or more of a capability indication for Doppler pre-compensating one or more frequency bands, a capability indication for Doppler pre-compensating one or more combinations of frequency bands, a capability indication for Doppler pre-compensating one or more high band or low band frequency ranges, or any combinations thereof.

In some examples of the method, apparatuses, and non-transitory computer-readable medium described herein, the Doppler compensation capability indication indicates that the UE supports multiple concurrent Doppler pre-compensations for multiple transmission-reception points, a number of concurrent Doppler pre-compensations that are supported by the UE, whether the capability is per component carrier or across component carriers, or per band or across a band combination, or per UE, or any combinations thereof. In some examples of the method, apparatuses, and non-transitory computer-readable medium described herein, the Doppler compensation capability indication further indicates that the UE supports receiving multiple downlink reference signals from the multiple transmission-reception points that are associated with a same uplink reference signal. In some examples of the method, apparatuses, and non-transitory computer-readable medium described herein, the first uplink communication includes one or more of a sounding reference signal, an uplink control channel communication, an uplink shared channel communication, an uplink random access channel communication, or any combinations thereof.

In some examples of the method, apparatuses, and non-transitory computer-readable medium described herein, the control information further indicates a first transmission configuration indicator state associated with the first transmission-reception point and a second transmission configuration indicator state associated with the second transmission-reception point, and where the first uplink communication is received at the first transmission-reception point based on the first transmission configuration indicator state. In some examples of the method, apparatuses, and non-transitory computer-readable medium described herein, the Doppler compensation capability indication indicates that the UE supports a single Doppler pre-compensation for each uplink communication from the UE, and where a single carrier frequency offset is applied to the first uplink communication. In some examples of the method, apparatuses, and non-transitory computer-readable medium described herein, the single carrier frequency offset may be determined based on one or more of an average doppler shift among at least the first transmission-reception point and the second transmission-reception point, or a linear estimation of weighted linear values for each transmission-reception point based on an associated downlink signal strength. In some examples of the method, apparatuses, and non-transitory computer-readable medium described herein, the control information further indicates a single transmission configuration indicator state associated with both the first transmission-reception point and the second transmission-reception point.

In some examples of the method, apparatuses, and non-transitory computer-readable medium described herein, the Doppler compensation capability indication indicates that Doppler pre-compensation may be unsupported by the UE. In some examples of the method, apparatuses, and non-transitory computer-readable medium described herein, the first uplink communication is not modulated to compensate for an estimated Doppler shift associated with the first transmission-reception point or the second transmission-reception point. In some examples of the method, apparatuses, and non-transitory computer-readable medium described herein, the first uplink communication includes an uplink reference signal that is not modulated to compensate for an estimated Doppler shift associated with the first transmission-reception point or the second transmission-reception point, and where one or more of an uplink control channel, uplink shared channel, or random access channel associated with the first uplink communication is compensated based on the estimated Doppler shift.

In some examples of the method, apparatuses, and non-transitory computer-readable medium described herein, the control information indicates that the UE is to use multiple concurrent Doppler pre-compensations for the first uplink communication, a single Doppler pre-compensation for the first uplink communication, or that no Doppler pre-compensation is to be used for the first uplink communication. In some examples of the method, apparatuses, and non-transitory computer-readable medium described herein, the single Doppler pre-compensation for the first uplink communication may be a default configuration when UE capability information for Doppler pre-compensation is not received. In some examples of the method, apparatuses, and non-transitory computer-readable medium described herein, the control information may be provided in RRC signaling that enables or disables Doppler shift pre-compensation for uplink communications. In some examples of the method, apparatuses, and non-transitory computer-readable medium described herein, the control information may be provided in one or more of a downlink control information communication or a medium access control (MAC) control element enables or disables Doppler shift pre-compensation for at least the first uplink communication.

In some examples of the method, apparatuses, and non-transitory computer-readable medium described herein, the control information provides an indication of Doppler shift pre-compensation based on one or more of a SRS resource that is mapped to Doppler shift pre-compensation, a SRS resource set that is mapped for Doppler shift pre-compensation, an uplink shared channel configuration, an uplink control channel configuration, one or more uplink bandwidth parts that are mapped for Doppler shift pre-compensation, one or more component carriers that are configured for Doppler shift pre-compensation, or any combinations thereof. In some examples of the method, apparatuses, and non-transitory computer-readable medium described herein, an indication of Doppler shift pre-compensation for the first uplink communication is based on a downlink reference signal that is transmitted to the UE, and where the downlink reference signal is mapped to an indication of whether Doppler shift pre-compensation is to be applied for uplink communications associated with the downlink reference signal.

DETAILED DESCRIPTION

Figure 1:
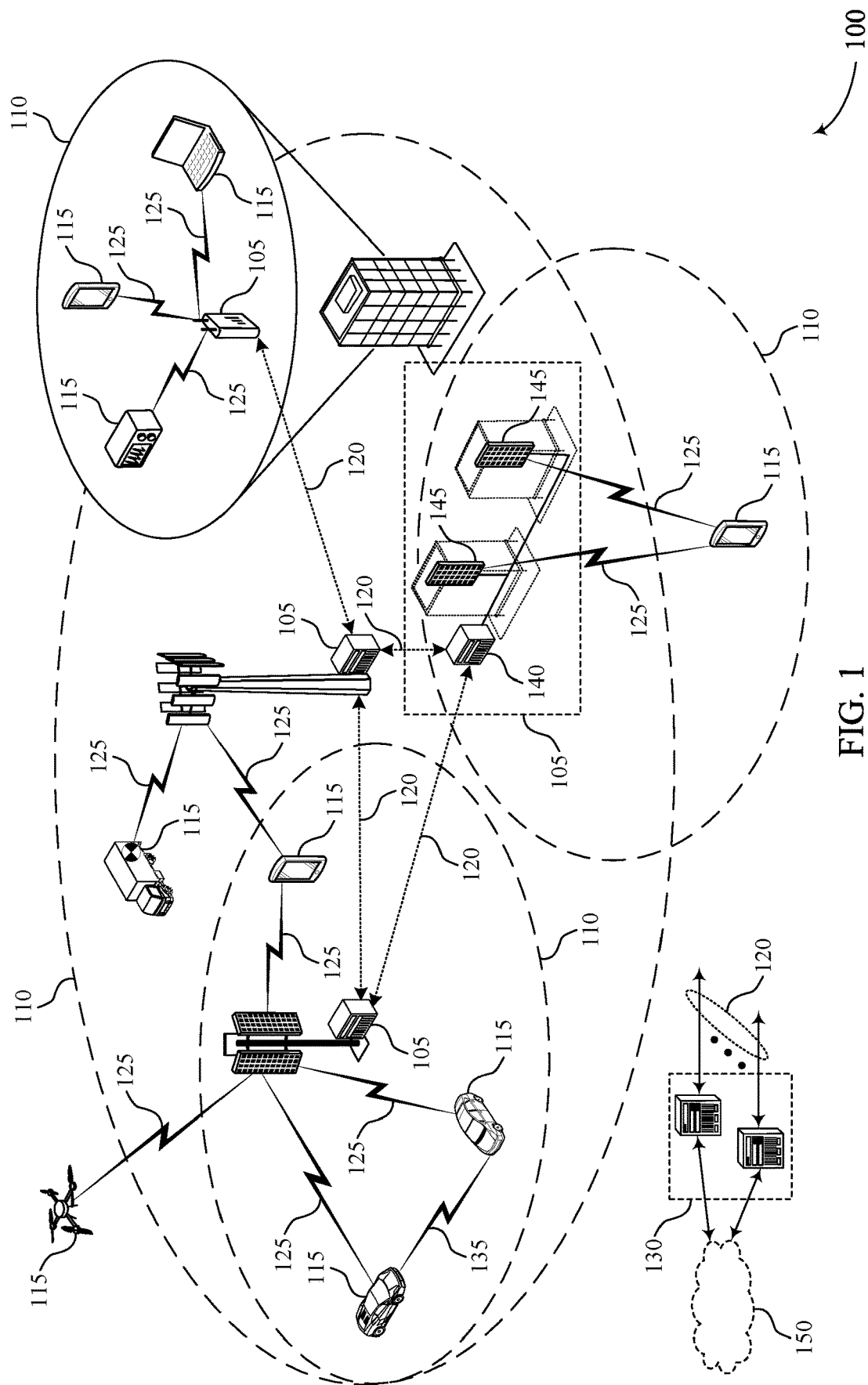
FIG. 1 illustrates an example of a system for wireless communications that supports doppler compensation capability signaling in wireless communications in accordance with aspects of the present disclosure.

In some wireless communications systems, a user equipment (UE) may support communications with one or multiple transmission reception points (TRPs) (e.g., in a multi-TRP configuration). For example, the wireless communications system may include a cell associated with multiple TRPs, in which a UE may communicate with the cell by more than one TRP. Additionally or alternatively, the wireless communications system may include a cell associated with multiple remote radio heads (RRHs), where the UE may communicate with a TRP by more than one RRH. For example, the UE may receive single frequency network (SFN) transmissions from the multiple TRPs (or multiple RRHs). That is, the UE may receive multiple instances of a transmission from each of the multiple TRPs and utilize them to decode a single downlink transmission. The UE may also transmit uplink communications to one or multiple TRPs. Additionally, the UE may be moving with respect to one or more of the TRPs. Thus, communications between the UE and each of the TRPs may by associated with Doppler shifts or Doppler spreads. In some cases, the Doppler effects on communications between a UE and the multiple TRPs may not be consistent from one TRP to another TRP. That is, communications between the UE and a first TRP may experience a larger Doppler shift than communications between the UE and a second TRP. In some cases, the variable Doppler effects on communications between the UE and the multiple TRPs may degrade communications (e.g., decrease a reliability of the communications) between the UE and the multiple TRPs.

In some cases, a UE or TRP may perform Doppler pre-compensation in which a center frequency (e.g., XO) of a communication may be adjusted such that the communications is received at the receiving device with relatively little or no frequency shift. In order to determine an amount of Doppler pre-compensation that is to be used for a communication, a UE or TRP may estimate a Doppler effect (e.g., an estimated Doppler shift, an estimated maximum Doppler spread). For example, a UE may receive a reference signal (e.g., a tracking reference signal (TRS), a synchronization signal block (SSB) transmission, a channel state information-reference signal (CSI-RS)) from one or multiple TRPs and estimate aspects of a channel (e.g., a Doppler shift, a Doppler spread) between each of the TRPs and UE. This estimation may then be used for Doppler pre-compensation from communications from the UE to one or more TRPs. The receiving TRP(s) may adjust one or more receive parameters based on whether the communication is Doppler pre-compensated or not. However, in order to select suitable receive parameters, the TRP(s) should be aware of whether the UE is using Doppler pre-compensation, and if so whether such pre-compensation is applied for one or multiple (TRPs), and existing signaling between UEs and TRPs may not provide for unambiguous indication of whether Doppler pre-compensation is used at a UE.

In accordance with various aspects of the present disclosure, a UE may provide a capability indication to one or multiple TRPs that indicates whether the UE is capable of performing Doppler pre-compensation. In some cases, responsive to the capability indication, one or more of the TRPs may transmit configuration information to the UE to configure Doppler pre-compensation. In some cases, the UE may indicate that multiple Doppler shifts for a single communication with multiple TRPs is supported. In other cases, the UE may indicate that a single Doppler shift is supported, or may indicate that no Doppler shift is supported. The UE, when Doppler pre-compensation is supported and configured, may estimate one or more Doppler metrics (e.g., a Doppler shift, a maximum Doppler spread, or both) for one or multiple TRPs based on one or more reference signals from the TRPs, and may transmit one or more uplink communications based on the estimated Doppler metrics. In some cases, the TRP may provide an indication to the UE that indicates whether uplink or downlink communications are Doppler pre-compensated, and the UE may select a transmission configuration indicator (TCI) state and associated quasi-co-location (QCL) relation based on the indication of Doppler pre-compensation. In some examples, the UE may support communications with multiple RRHs located at different geographic locations of a single TRP. Thus, in such cases, the UE may estimate Doppler metrics for one or multiple RRHs, such as based on a first reference signal from a first RRH of a first TRP and the second reference signal from a second RRH of a second TRP, where the first TRP and the second TRP may be the same TRP or different TRPs.

Various aspects of the subject matter described herein may be implemented to realize one or more of the following potential advantages. The techniques employed by the described UEs may provide benefits and enhancements to the operation of the UEs. For example, operations performed by the UEs may provide improvements to reliability and efficiency in receiving and decoding communications with one or multiple TRPs, in which Doppler pre-compensation may help reduce the likelihood of decoding errors due to uncompensated frequency offsets. Such techniques may be useful in various different situations, such as in cases where a UE is traveling at a relatively high speed in relation to one or more TRPs (e.g., in high speed train (HST) scenarios), and received signals may have a relatively large Doppler shifts. The described techniques may thus include features for improvements to reliability in communications and enhanced communications efficiency.

Aspects of the disclosure are initially described in the context of wireless communications systems. Various examples of Doppler compensated communications and processes are then discussed for communications between UEs and TRPs. Aspects of the disclosure are further illustrated by and described with reference to apparatus diagrams, system diagrams, and flowcharts that relate to doppler compensation capability signaling in wireless communications.

FIG. 1 illustrates an example of a wireless communications system 100 that supports doppler compensation capability signaling in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof.

For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS, which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Wireless communications systems 100 may support deployments in which UEs 115 may move at high speeds relative to one or more base stations 105 (e.g., TRPs). For example, a set of TRPs may be associated with coverage areas 110 that include a high speed train (HST) line. UEs 115 associated with the HST thus may have high mobility, and communications with such UEs 115 may also experience relatively high Doppler effects. In order to provide enhanced reliability in such cases, multi-TRP communications may be enabled in which a UE 115 may receive downlink transmissions (e.g., downlink reference signals, physical downlink shared channel (PDSCH) communications, physical downlink control channel (PDCCH) communications, etc.) from multiple TRPs and transmit uplink communications (e.g., uplink reference signals, physical uplink shared channel (PUSCH) communications, physical uplink control channel (PUCCH) communications, etc.) to multiple TRPs. Additionally, the UE 115 may decode each of the downlink transmissions according to a transmission configuration indicator (TCI) state (e.g., a beam configuration) associated with the downlink transmission, and transmit uplink communications based on the TCI state. In some cases, each TCI state may correspond to a quasi-colocation (QCL) relationship. For example, the UE 115-a may assume that certain channel estimations may be similar for uplink and downlink transmissions associated with a same TCI state (e.g., due to the QCL relationship). In some cases of the multi-TRP configuration, a single TRP may transmit downlink control information (DCI) selecting multiple TCI states each associated with a communications with one of the multiple TRPs (e.g., when the multiple TRPs have an ideal backhaul communication link).

In some cases, a UE 115 may Doppler pre-compensate uplink communications based on one or more Doppler estimates made for one or more TRPs. In some cases, such a UE 115 may provide a capability indication to one or multiple TRPs that indicates whether the UE 115 is capable of performing Doppler pre-compensation. In some cases, responsive to the capability indication, one or more of the TRPs may transmit configuration information to the UE 115 to configure Doppler pre-compensation, in accordance with various aspects as discussed herein.

Figure 2:
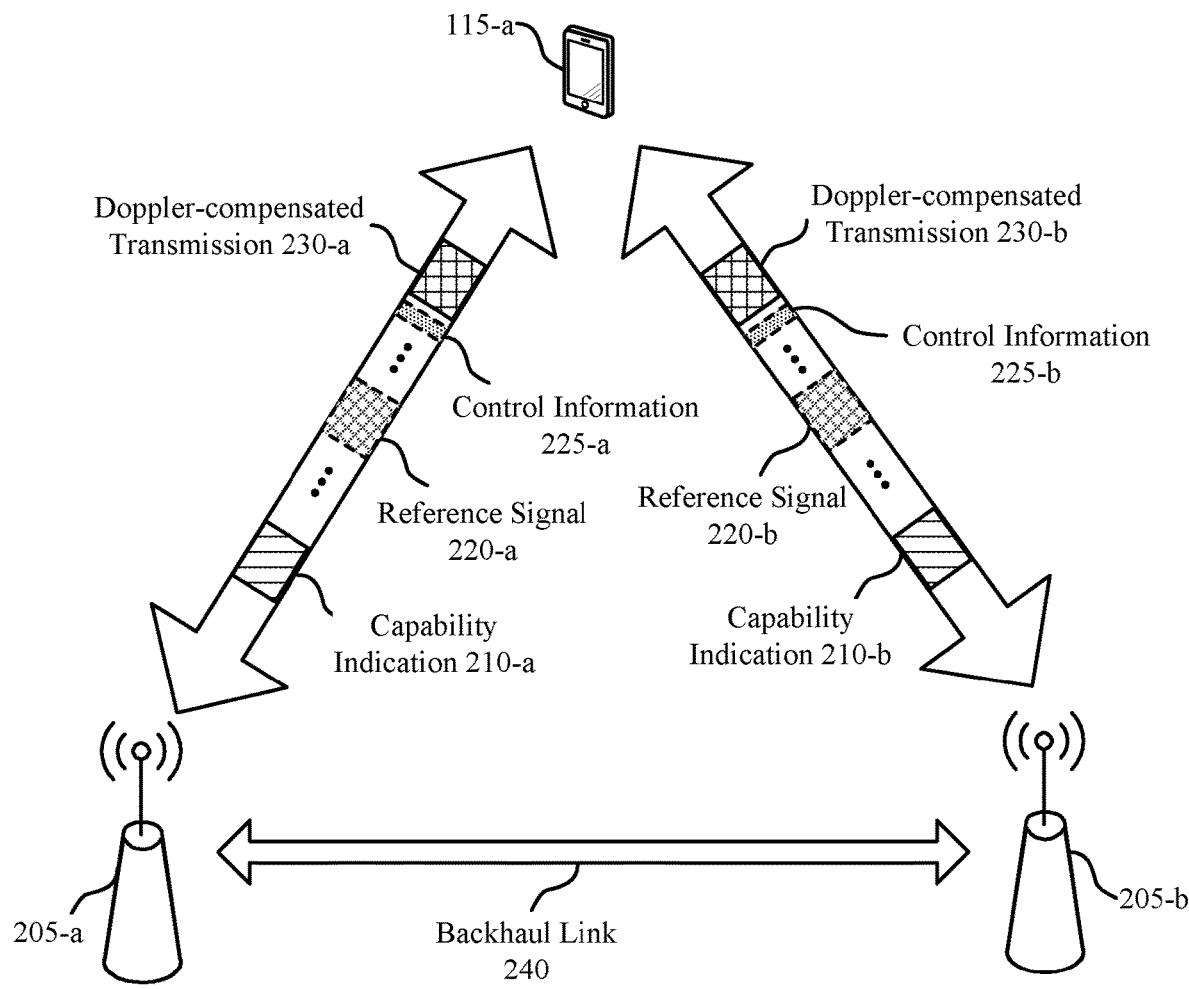
FIG. 2 illustrates an example of a portion of a wireless communications system that supports doppler compensation capability signaling in wireless communications in accordance with aspects of the present disclosure.

FIG. 2 illustrates an example of a wireless communications system 200 that supports doppler compensation capability signaling in wireless communications in accordance with aspects of the present disclosure. In some examples, wireless communications system 200 may implement aspects of wireless communications system 100. The wireless communications system 200 may include a UE 115-a, which may be an example of a UE 115 as described with reference to FIG. 1. Additionally, the wireless communications system 200 may include TRPs 205, which may be examples of access network transmission entities 145 as described with reference to FIG. 1. In wireless communications system 200, the UE 115-a may be configured to communicate with multiple TRPs 205 (e.g., TRP 205-a and TRP 205-b).

The UE 115-a may be in communication with a serving cell by the first TRP 205-a and the second TRP 205-b. In some cases, the UE 115-a may additionally be in communication with additional TRPs 205 associated with the serving cell. The UE 115-a may receive one or more indications (e.g., via RRC signaling, MAC-CE signaling, DCI transmissions, or combinations thereof) of active TCI states associated with communications with the TRP 205-a and the TRP 205-b. For example, the TRP 205-a may transmit DCI to the UE 115-a indicating a first TCI state for communications between the TRP 205-a and the UE 115-a. Additionally, the TRP 205-b may transmit DCI to the UE 115-a indicating a second TCI state (e.g., different from the first TCI state) for communications between the TRP 205-b and the UE 115-a. In another example, one of the TRPs 205 may transmit DCI to the UE 115-a that indicates the first TCI state for communications between the UE 115-a and the TRP 205-a and the second TCI state for communications between the UE 115-a and the TRP 205-b.

The UE 115-a may be capable of estimating Doppler metrics associated with the different channels between the UE 115-a and the TRPs 205 (e.g., the channel between the UE 115-a and the TRP 205-a and the channel between the UE 115-a and the TRP 205-b). In some cases, the UE 115-a may transmit a capability indication 210-a that provides the first TRP 205-a with an indication of a capability of the UE 115-a to estimate a Doppler metrics. Additionally or alternatively, the UE 115-a may transmit capability indication 210-a to the second TRP 205-b to provide Doppler estimation and compensation capabilities of the UE 115-a. In some cases, the TRP 205 that receives the indication of the UE capability to estimate the Doppler metrics and perform Doppler compensation may communicate the UE capability to the other TRP 205 (e.g., by the backhaul link 240). Based on determining that the UE 115-a is capable of estimating Doppler metrics for channels between the UE 115-a and one or multiple TRPs 205, one of the TRPs 205 may transmit an indication (e.g., via RRC, DCI, MAC-CE, etc.) configuring the UE 115-a to perform the Doppler estimation.

In the example of FIG. 2, the first TRP 205-a may transmit a first reference signal 220-a by the first TCI state and the second TRP 205-a may transmit the second reference signal 220-b by the second TCI state. The reference signals 220 may be, for example, a tracking reference signal (TRS) that may allow the UE 115-a to measure a frequency offset. In some cases, the UE 115-a may have a capability for multiple concurrent Doppler estimations/compensations. In such cases, the UE 115-a may receive the first reference signal 220-a according to a different TCI state than the second reference signal 220-b. This may enable the UE 115-a to perform a first channel estimation procedure using the first reference signal 220-a separately from performing a second channel estimation procedure using the second reference signal 220-b. When performing the channel estimation procedures, the UE 115-a may use the reference signals 220 to determine channel condition indicators (e.g., channel quality indicator (CQI), reference signal received power (RSRP), reference signal received quality (RSRQ), signal-to-interference-plus-noise ratio (SINR), rank indicator (RI)) for downlink transmissions associated with each TRP 205. That is, the UE 115-a may determine a signal strength associated with each of the received reference signals 220 (e.g., based on the RSRQ, the SINR).

Additionally, the UE 115-a may estimate one or more Doppler metrics (e.g., a Doppler shift, a Doppler spread) associated with each TRP 205 based on the received reference signals 220. For example, the UE 115-a may estimate a first Doppler shift or a first Doppler spread associated with the first TRP 205-a based on receiving the first reference signal 220-a. Additionally, the UE 115-a may estimate a second Doppler shift or a second Doppler spread associated with the second TRP 205-b based on receiving the second reference signal 220-b. In other cases, the UE 115-a may have a capability for a single Doppler shift compensation, and measurements of the reference signals 220 may be used to determine a single Doppler spread or Doppler shift to be used for compensating uplink communications with the TRPs 205.

The UE 115-a may receive the reference signals 220 based on a TCI state corresponding to a TRP 205. In some cases, one or both of the TRPs 205 may transmit an indication (e.g., via DCI) of a first TCI state associated with the first reference signal 220-a and a second TCI state (e.g., unique from the first TCI state) associated with the second reference signal 220-b. In some cases, the UE 115-a may identify with which TRP 205 is associated with each reference signal 220 based on a TCI state associated with the reference signal 220 (e.g., based on a CORESET associated with the received DCI indicating the TCI states). That is, the CORESET associated with the DCI indication may be associated with a CORESET index (e.g., a CORESET-PoolIndex) that indicates one or more TRPs 205. For example, the first TRP 205-a may be associated with a first CORESET index and the TRP 205-b may be associated with a second CORESET index. Here, the UE 115-a may identify that the first TCI state is associated with the first reference signal 220-a based on a CORESET of the indication of the first TCI state being associated with the first CORESET index. Additionally, the UE 115-a may identify that the second TCI state is associated with the second reference signal 220-b based on a CORESET of the indication of the second TCI state being associated with the second CORESET index.

The UE 115-a may decode the reference signals 220 based on a TCI state associated with the reference signal 220. For example, the UE 115-a may decode the first reference signal 220-a according to the first TCI state and may decode the second reference signal 220-b according to the second TCI state. In cases where multiple Doppler shifts are supported, the UE 115-a may then estimate the first Doppler shift based on the first reference signal 220-a and may estimate the second Doppler shift based on the second reference signal 220-b. In some cases, the UE 115-a may associate the first Doppler shift with the first CORESET index and the second Doppler shift with the second CORESET index.

In some cases, the UE 115-a may indicate the estimated Doppler metrics (e.g., an estimated Doppler shift, an estimated Doppler spread, or both) associated with the first TRP 205-a and the second TRP 205-b to one or both of the TRPs 205 (e.g., by a CSI report to one or both of the TRPs 205). The UE 115-a may receive control information 225 from one or both TRPs 205, which may provide an allocation of resources for an uplink communication from the UE 115-a. In some cases, the control information 225 may indicate whether the UE 115-a is to apply Doppler pre-compensation to the uplink communication. Based on the control information 225, the UE 115-a may transmit Doppler pre-compensated transmission 230.

In some cases, for multiple-TRP 205 communications, the UE 115-a can estimate two or more Doppler shifts (e.g., center frequency offsets (CFOs)) for each TRP 205 based on the corresponding reference signals 220 (e.g., TRSs). The UE 115-a can either correct the uplink transmission for each TRP 205 independently using the corresponding CFO or it can choose some other behavior, such as not compensating for Doppler shifts or just compensating with a single CFO for all links.

The capability indication 210 may provide capability reporting for each of a number of frequency bands, for one or more combinations of frequency bands, for low-band (e.g., frequency range 1 (FR1) or sub-6 GHz) and high-band (e.g., FR2 or above 6 GHz) communications, or any combinations thereof. In some case, each of multiple different UEs may provide separate per-UE capability reporting, and TRPs 205 may configure communications in accordance with the reported UE capability.

In cases where the UE 115-a reports capability for multiple Doppler shifts/spread compensation, the UE 115-a may estimate the Doppler shift for each TRP 205 and modulate uplink communications targeted for each TRP 205 with the corresponding Doppler shift. In the example of FIG. 2, the UE 115-a may compensate first Doppler-compensated transmission 230-a based on an estimated Doppler shift of the first TRP 205-a and may compensate second Doppler-compensated transmission 230-b based on an estimated Doppler shift of the second TRP 205-b. In some cases, the UE 115-a may indicate the maximum number of different Doppler shift/spreads that it can simultaneously support in the capability indication 210. In some cases, when the UE 115-a supports multiple Doppler shifts for multiple TRPs 205, this may also mean that the UE 115-a supports the capability of being configured with one SRS associated with multiple downlink reference signals 220 (e.g., TRS1 and TRS2). If the UE 115-a does not support multiple-TRS-association to single SRS, then the UE 115-a may signal that Doppler pre-compensation is supported for one Doppler shift or that Doppler pre-compensation is not supported. In some cases, this capability can be per component carrier (CC), and/or across all CCs. In some cases, the UE 115-a can modulate the uplink transmission for SRS, PUCCH, PUSCH, PRACH, or any combinations thereof. This mode may be useful for multi-states (or multi spatial filter/beam) uplink transmissions where each TCI state maps to a single TRP 205.

In other cases, the UE 115-a may indicate that a single Doppler shift compensation is supported. In such cases, the UE 115-a may modulate the uplink transmission for all TRPs 205 with the same CFO/Doppler shift. This capability may apply to uplink signals for SRS, PUCCH, PUSCH, PRACH, or any combinations thereof. When determining the amount of Doppler pre-compensation to apply, the UE 115-a in such cases may determine an average of Doppler shifts among the TRPs 205. In some cases, the average can be linear estimation of weighted linear values based on the strength of the downlink signals from each TRP 205. This mode may be useful for single TCI state uplink transmissions.

In other cases, the capability indication 210 of the UE 115-a may indicate that no Doppler shift compensation is supported. In such cases, the UE 115-a will not modulate the uplink transmissions with the estimated Doppler shift. In some cases, such uncompensated signals may be only for the SRS and not for the remaining signals (e.g., PRACH, PUCCH, PUSCH). In some cases, if the UE 115-a reports that multi-Doppler shift compensations are supported, it can be downgraded by the network to use only a single Doppler shift compensation or no Doppler shift compensation (e.g., based on the control information 225). Similarly if the UE 115-a reports capability for a single Doppler shift compensation, the network may downgrade the UE 115-a to use no Doppler per-compensation. In some case, if the UE 115-a has not reported the capability, the default assumption is that the UE 115-a supports a single Doppler shift.

In some cases, based on the capability indication 210, the network may enable the UE 115-a for uplink Doppler shift compensation for communications with TRPs 205. In some cases, one or more of the TRPs 205 may provide an indication to the UE 115-a, such as by setting a flag or other value, that indicates uplink Doppler shift compensation is enables corresponding to the reported capability. For example, RRC signaling may be provided that enables Doppler shift compensation. After receiving the enablement indication, the UE 115-a may begin modulating uplink transmissions with Doppler shift(s). In some cases, Doppler shift compensation may be enabled or disabled dynamically or semi-statically, such as through downlink control information (DCI), a MAC-CE, an RRC reconfiguration, or any combinations thereof. The configured/triggered/activated option of Doppler shift compensation may be part of each SRS resource, SRS resource set, PUSCH, PUCCH, Uplink-bandwidth part BWP, a CC configuration, or any combinations thereof. In some cases, the Doppler compensation indication may be mapped to a configuration of a downlink reference signal 220, such that any uplink signal associated with the downlink reference signal 220 will use the mapped Doppler shift option.

Such techniques may thus allow for enhanced efficiency and reliability in communications between UE 115-a and TRPs 205 through the TRPs 205 a more accurately compensating for frequency offsets that may be observed in the received communications. In some cases, the UE 115-a may use a TCI state for communications that is selected based on whether the uplink or downlink communications are Doppler pre-compensated or not. Such techniques may be advantageous in cases where relatively large and changing Doppler shifts among TRPs 205 may be present, such as in cases where the UE 115-a may have high mobility and travel at a relatively high rate of speed relative to different TRPs 205 (e.g., in high speed trains where the first TRP 205-a and the second TRP 205-b may have relatively large opposing Doppler shifts).

Figure 3:
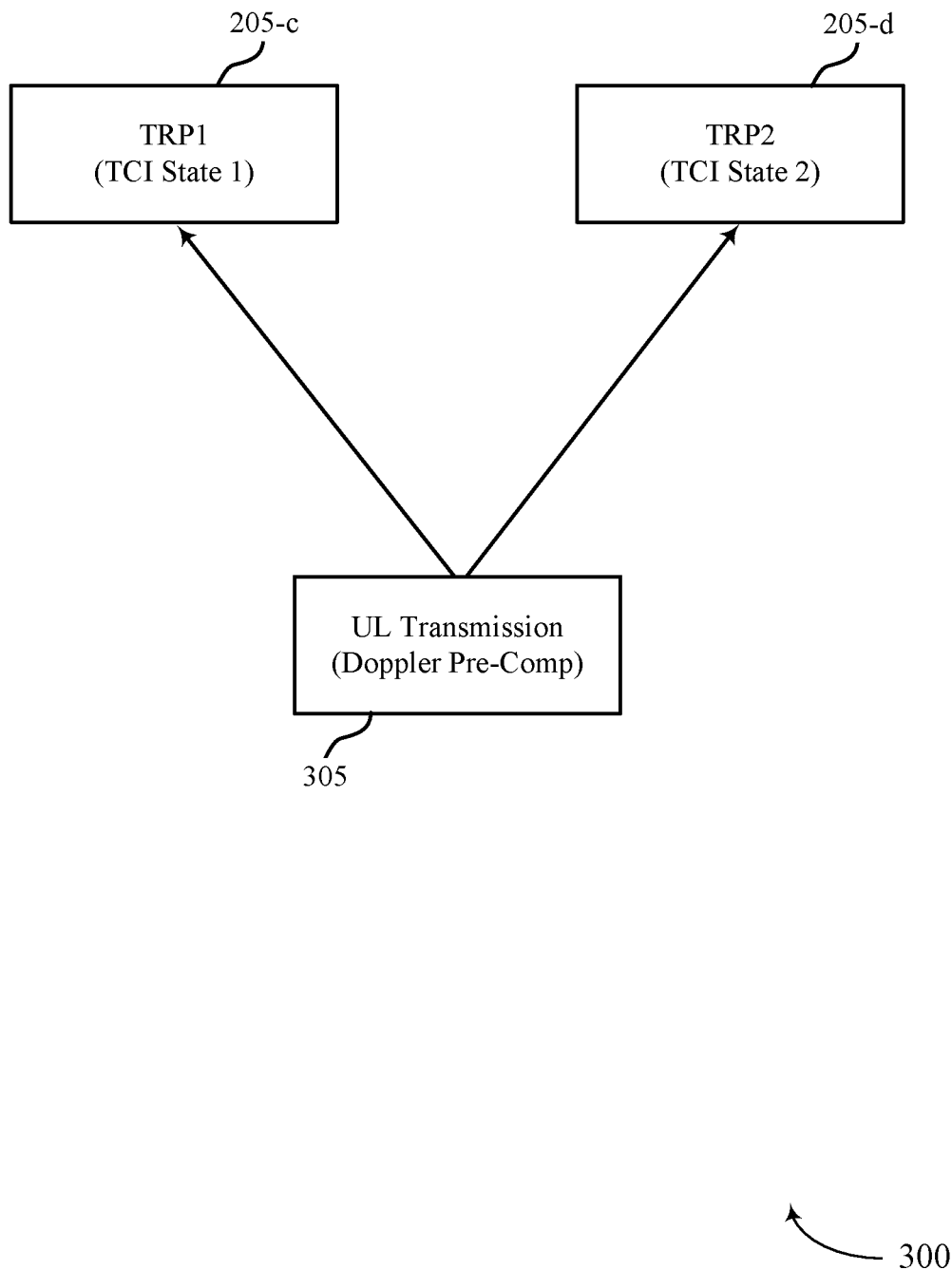
FIG. 3 illustrates an example of a multi-TRP communication that supports doppler compensation capability signaling in wireless communications in accordance with aspects of the present disclosure.

FIG. 3 illustrates an example of a multi-TRP communication 300 that supports doppler compensation capability signaling in wireless communications in accordance with aspects of the present disclosure. In some examples, multi-TRP communication 300 may implement aspects of wireless communications system 100 or 200. In this example, one or more TRPs 205 (e.g., TRPs of FIG. 1 or 2) may transmit one or more reference signals that may be used at a UE (e.g., a UE of FIG. 1 or 2) to estimate a Doppler shift associated with the TRP. The UE may use this estimation to provide Doppler pre-compensation for a subsequent uplink transmission 305.

In some cases, multi-TRP communications may provide communications in which UE transmissions are received at multiple TRPs 205. In the example of FIG. 3, a first uplink communication may be transmitted to a first TRP 205-c that is associated with a first TCI state. Likewise, a second uplink communication may be transmitted to second TRP 205-d that is associated with a second TCI state. Both the first uplink communication and the second uplink communication may provide a same PUSCH communication, in which component signals for different TRPs may be Doppler pre-compensated. The UE may use the separate TCI states for the uplink communications, and each TRP 205 may perform demodulation and decoding of the communications based on the associated TCI states. In some cases, where a UE is configured with multiple activated TCI states, each TCI state may indicate whether the corresponding TRP link is to be Doppler pre-compensated (e.g., based on a TCI state index that is mapped to Doppler pre-compensation, or a TCI state with RRC parameter for pre-compensation set to enabled).

Figure 4:
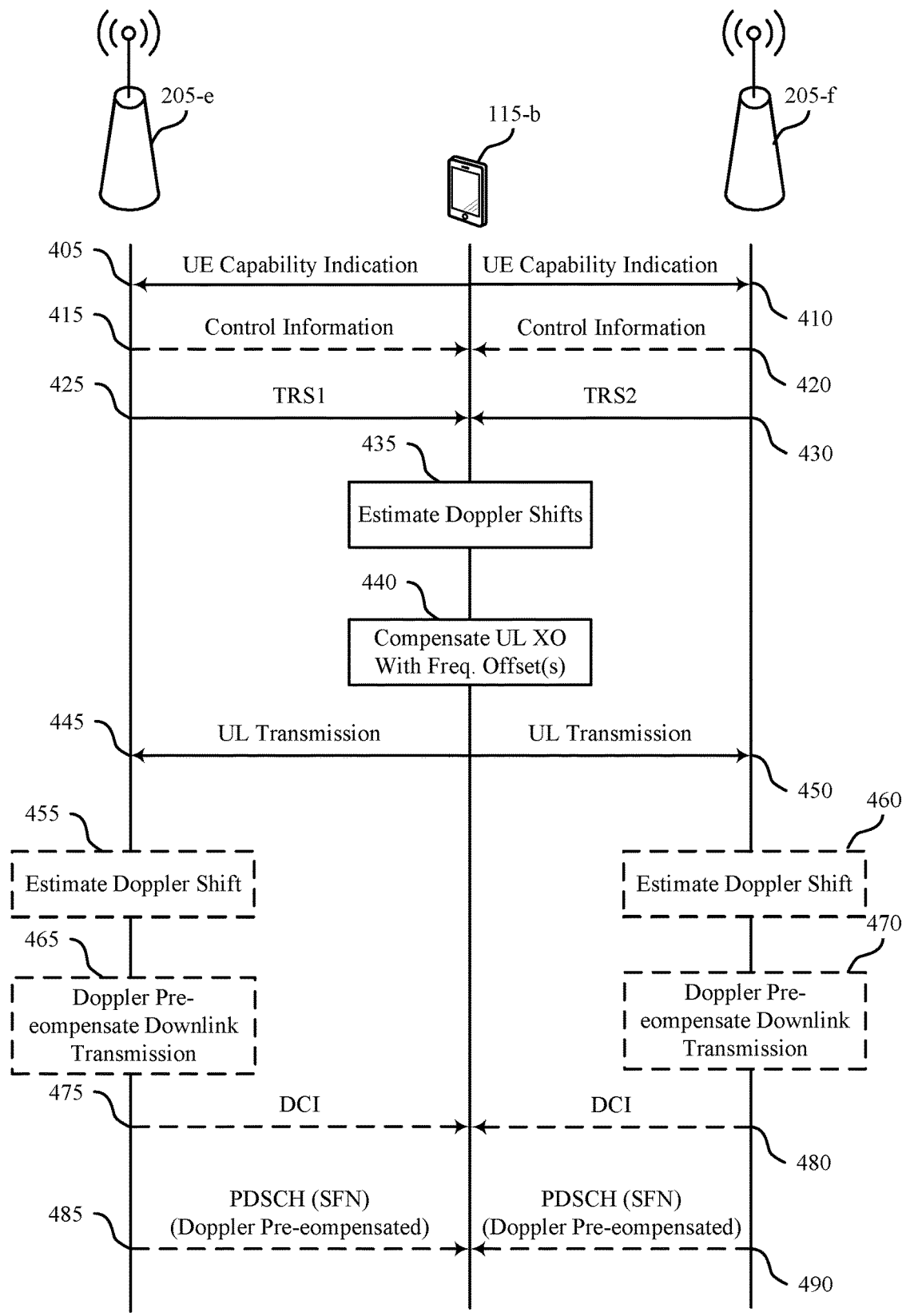
FIG. 4 illustrates an example of a process flow that supports doppler compensation capability signaling in wireless communications in accordance with aspects of the present disclosure.

FIG. 4 illustrates an example of a process flow 400 that supports doppler compensation capability signaling in wireless communications in accordance with aspects of the present disclosure. In some examples, process flow 400 may implement aspects of wireless communications system 100 or 200. Process flow may include a UE 115-b, a first TRP 205-e, and a second TRP 205-f, which may each be examples of UEs and TRPs as described with reference to FIGS. 1 through 3. Additionally, TRPs 205 may be a part of a same base station, or be associated with different base stations, that may be examples a base station as described with reference to FIGS. 1 and 2. Further, TRPs 205 may be RRHs that are associated with same or different TRPs.

At 405, the UE 115-b may transmit a UE capability indication to the first TRP 205-e. The UE capability indication may indicate to the first TRP 205-e Doppler compensation capabilities of the UE 115-b (e.g., that the UE 115-b is capable of estimating and compensating based on multiple or single Doppler shifts, or does not support Doppler shift estimation and compensation). At 410, the UE 115-b may transmit the UE capability indication to the second TRP 205-f. That is, the UE 115-b may transmit the UE capability indication to the second TRP 205-f instead of transmitting the UE capability to the first TRP 205-e at 405. In some other cases, the UE 115-b may transmit the UE capability indication to both the first TRP 205-e and the second TRP 205-f.

At 415, the first TRP 205-e may transmit a control information communication to the UE 115-b. At 420, the second TRP 205-f may transmit the control information communication to the UE 115-b. In some cases, only one of the TRPs 205 may transmit the control information, or both of the TRPs may transmit all or a portion of the control information. In some cases, the control information indicates whether the UE 115-b is to perform Doppler shift/spread estimations and compensations for communications with the TRPs, in accordance with techniques as discussed herein.

At 425, the first TRP 205-e may transmit a first TRS (or other reference signal) to the UE 115-b. In some cases, the first TRP 205-e may transmit the reference signal based on receiving the UE capability indication indicating that the UE 115-b may estimate a Doppler shift associated with the reference signal. At 430, the second TRP 205-f may transmit a second TRS (or other reference signal) to the UE 115-b. In some cases, the second TRP 205-f may transmit the reference signal based on receiving a UE capability indication indicating that the UE 115-b may estimate a Doppler shift associated with the reference signal. In some cases, the reference signals may be a TRS, an SSB transmission, a CSI-RS, or a combination thereof.

At 435, the UE 115-b may estimate one or more Doppler shifts associated with the TRPs 205. In cases where the UE 115-b signals a capability for multiple Doppler shift compensation, and where the control information enables multiple Doppler shift compensation, the UE 115-b may estimate a first Doppler shift associated with the first TRP 205-e and a second Doppler shift associated with the second TRP 205-f. In some cases, the UE 115-b may estimate the first Doppler shift based on the reference signal received from the first TRP 205-e. In some cases, the UE may estimate the second Doppler shift based on the reference signal received from the second TRP 205-f. In cases where the UE 115-b signals a capability for a single Doppler shift compensation, or the configuration information configures a single Doppler shift compensation, the UE 115-b may estimate a single Doppler shift based on one or both of the TRSs. In some cases, the Doppler shift may be estimated based on only one of the TRSs (e.g., based on a highest received signal strength). In other cases, the single Doppler shift may be estimated based on an average of both TRSs. In some cases, the average may be a weighted average (e.g., based on signal strength). In some cases, the single Doppler shift may be based on a linear estimation of weighted linear values based on the strength of the TRSs. At 440, the UE 115-*b* may compensate an uplink center frequency based on one or more frequency offsets that are determined based on the estimated Doppler shift(s).

At 445, the UE 115-*b* may transmit Doppler compensated uplink communication to the first TRP 205-*e*, in accordance with techniques as discussed herein. At 450, the UE 115-*b* may transmit Doppler compensated uplink communication to the second TRP 205-*f*, in accordance with techniques as discussed herein.

Optionally, at 455, the first TRP 205-*e* may estimate a Doppler shift associated with uplink communications from the UE 115-*b*. Likewise, in this example, at 460, the second TRP 205-*f* may also estimate a Doppler shift associated with uplink communications from the UE 115-*b*. In some cases, each TRP 205 may measure a frequency offset associated with the UE 115-*b* based on an SRS from the UE 115-*b*.

Optionally, at 465, the first TRP 205-*e* may Doppler pre-compensate a downlink transmission (e.g., a PDSCH transmission) based on the estimated Doppler shift. At 470, the second TRP 205-*f* may Doppler pre-compensate a downlink transmission (e.g., a PDSCH transmission) based on the estimated Doppler shift. In some cases, one or both TRPs 205 may not Doppler pre-compensate their respective downlink transmissions.

Optionally, at 475 and at 480, one or both of the first TRP 205-*e* or second TRP 205-*f* may transmit a DCI to the UE 115-*b* that schedules a PDSCH communication. In some cases, the DCI may include an indication of whether the PDSCH communication is Doppler pre-compensated or not. Optionally, at 485, the first TRP 205-*e* may transmit a Doppler pre-compensated downlink transmission to the UE 115-*b* via a PDSCH. Similarly, at 490, the second TRP 205-*f* may transmit a Doppler compensated downlink transmission to the UE 115-*b* via the PDSCH. In some cases, the UE 115-*b* may select a TCI state for the PDSCHs based on the Doppler pre-compensation indication, and a QCL relation with the TRPs 205 may change based on the Doppler pre-compensation indication.

Figure 5:
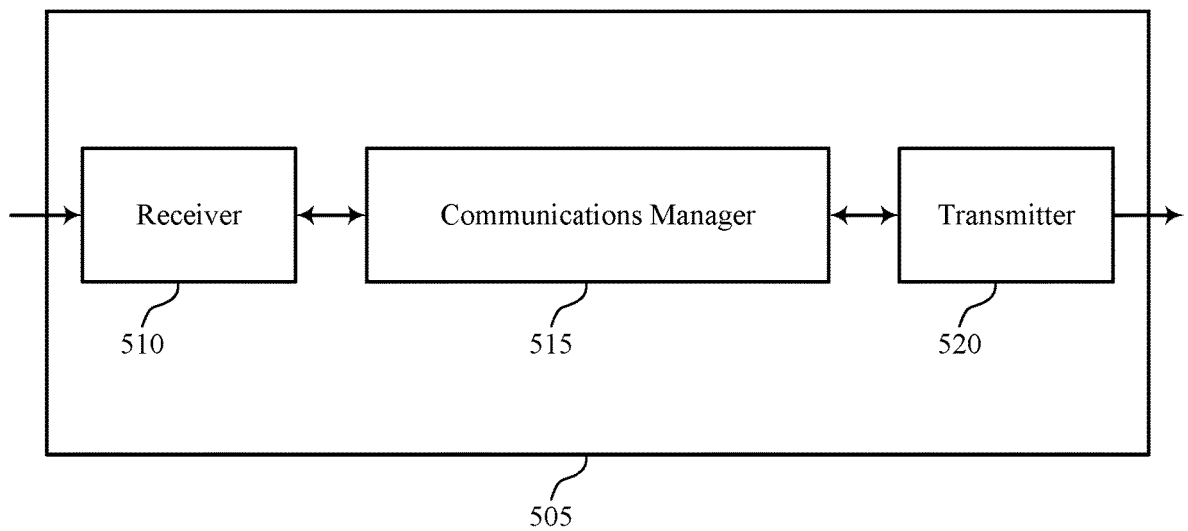
FIGS. 5 and 6 show block diagrams of devices that support doppler compensation capability signaling in wireless communications in accordance with aspects of the present disclosure.

FIG. 5 shows a block diagram 500 of a device 505 that supports doppler compensation capability signaling in wireless communications in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to doppler compensation capability signaling in wireless communications, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit a Doppler compensation capability indication to a first transmission-reception point of two or more transmission-reception points that are in communication with the UE, where the Doppler compensation capability indication signals one or more capabilities of the UE for Doppler pre-compensating one or more uplink communications to one or more of the first transmission-reception point or a second transmission-reception point, receive, from one or more of the first transmission-reception point or the second transmission-reception point, control information for at least a first uplink communication to be transmitted from the UE to one or more of the first transmission-reception point or the second transmission-reception point based on the Doppler compensation capability indication, and transmit the first uplink communication to one or more of the first transmission-reception point or the second transmission-reception point based on the control information. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
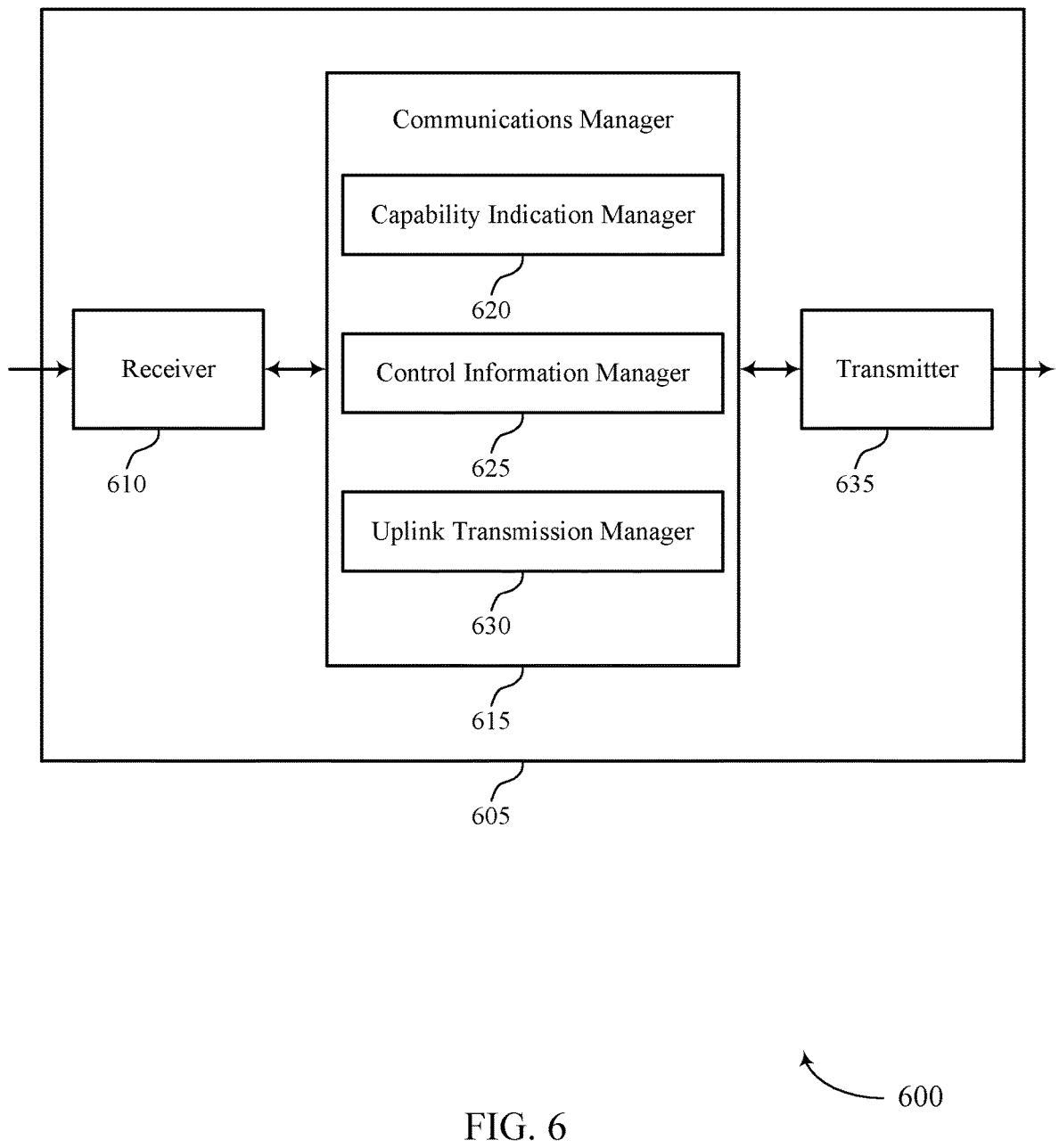

FIG. 6 shows a block diagram 600 of a device 605 that supports doppler compensation capability signaling in wireless communications in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to doppler compensation capability signaling in wireless communications, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a capability indication manager 620, a control information manager 625, and an uplink transmission manager 630. The communications manager 615 may be an example of aspects of the communications manager 810 described herein.

The capability indication manager 620 may transmit a Doppler compensation capability indication to a first transmission-reception point of two or more transmission-reception points that are in communication with the UE, where the Doppler compensation capability indication signals one or more capabilities of the UE for Doppler pre-compensating one or more uplink communications to one or more of the first transmission-reception point or a second transmission-reception point.

The control information manager 625 may receive, from one or more of the first transmission-reception point or the second transmission-reception point, control information for at least a first uplink communication to be transmitted from the UE to one or more of the first transmission-reception point or the second transmission-reception point based on the Doppler compensation capability indication.

The uplink transmission manager 630 may transmit the first uplink communication to one or more of the first transmission-reception point or the second transmission-reception point based on the control information.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
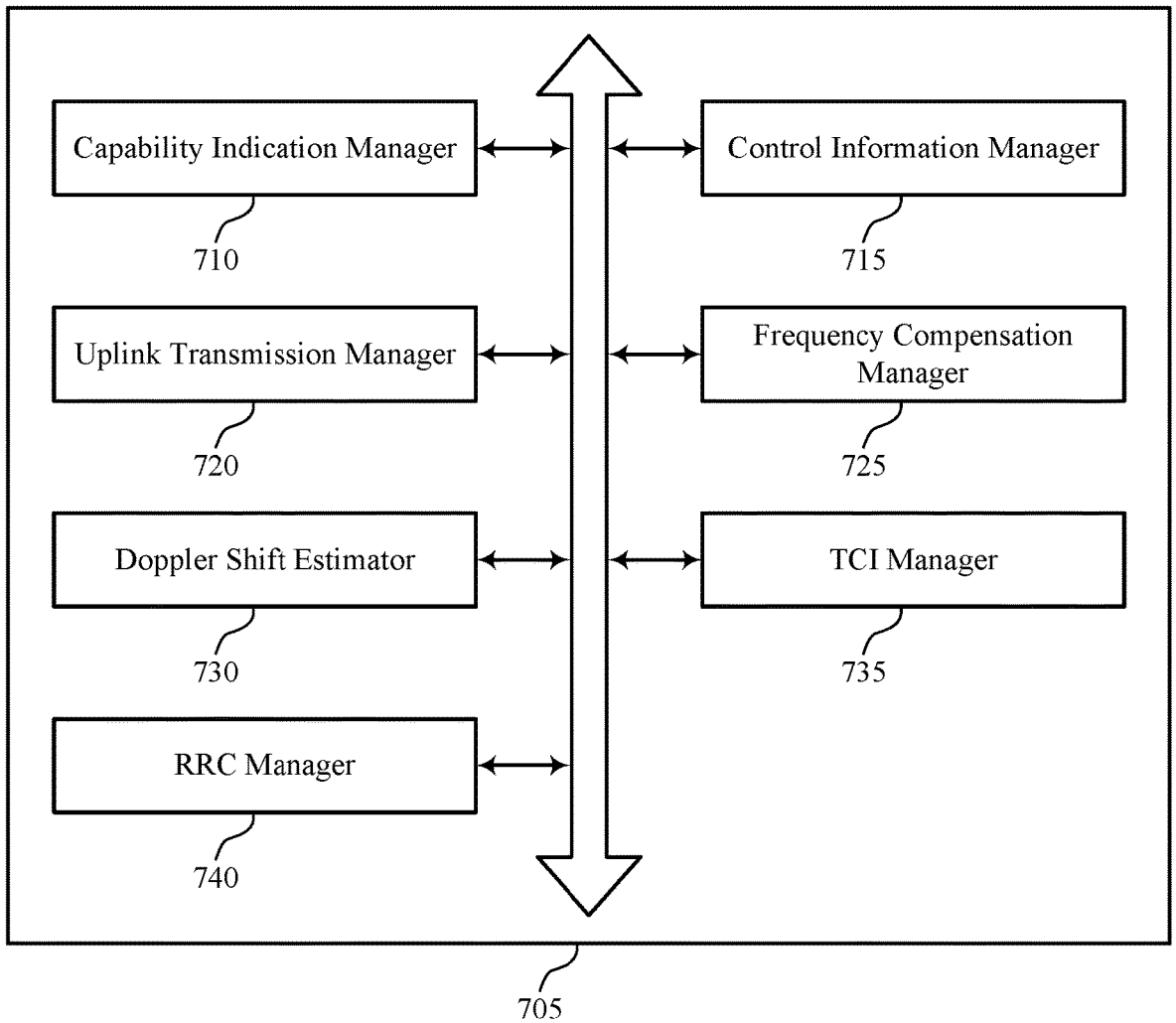
FIG. 7 shows a block diagram of a communications manager that supports doppler compensation capability signaling in wireless communications in accordance with aspects of the present disclosure.

FIG. 7 shows a block diagram 700 of a communications manager 705 that supports doppler compensation capability signaling in wireless communications in accordance with aspects of the present disclosure. The communications manager 705 may be an example of aspects of a communications manager 515, a communications manager 615, or a communications manager 810 described herein. The communications manager 705 may include a capability indication manager 710, a control information manager 715, an uplink transmission manager 720, a frequency compensation manager 725, a doppler shift estimator 730, a TCI manager 735, and a RRC manager 740. Each of these modules may communicate, directly or indirectly, with one another (e.g., via one or more buses).

The capability indication manager 710 may transmit a Doppler compensation capability indication to a first transmission-reception point of two or more transmission-reception points that are in communication with the UE, where the Doppler compensation capability indication signals one or more capabilities of the UE for Doppler pre-compensating one or more uplink communications to one or more of the first transmission-reception point or a second transmission-reception point. In some examples, the capability indication manager 710 may transmit one or more of a capability indication for Doppler pre-compensating one or more frequency bands, a capability indication for Doppler pre-compensating one or more combinations of frequency bands, a capability indication for Doppler pre-compensating one or more high band or low band frequency ranges, or any combinations thereof. In some cases, the Doppler compensation capability indication indicates that the UE supports multiple concurrent Doppler pre-compensations for multiple transmission-reception points, a number of concurrent Doppler pre-compensations that are supported by the UE, whether the capability is per component carrier or across component carriers, or per band or across a band combination, or per UE, or any combinations thereof.

In some cases, the Doppler compensation capability indication further indicates that the UE supports receiving multiple downlink reference signals from the multiple transmission-reception points that are associated with a same uplink reference signal. In some cases, the Doppler compensation capability indication indicates that the UE supports a single Doppler pre-compensation for each uplink communication from the UE. In some cases, the Doppler compensation capability indication indicates that Doppler pre-compensation is unsupported by the UE.

The control information manager 715 may receive, from one or more of the first transmission-reception point or the second transmission-reception point, control information for at least a first uplink communication to be transmitted from the UE to one or more of the first transmission-reception point or the second transmission-reception point based on the Doppler compensation capability indication. In some cases, the control information indicates that the UE is to use multiple concurrent Doppler pre-compensations for the first uplink communication, a single Doppler pre-compensation for the first uplink communication, or that no Doppler pre-compensation is to be used for the first uplink communication. In some cases, the control information is provided in one or more of a downlink control information communication or a medium access control (MAC) control element enables or disables Doppler shift pre-compensation for at least the first uplink communication.

In some cases, the control information provides an indication of Doppler shift pre-compensation based on one or more of a SRS resource that is mapped to Doppler shift pre-compensation, a SRS resource set that is mapped for Doppler shift pre-compensation, an uplink shared channel configuration, an uplink control channel configuration, one or more uplink bandwidth parts that are mapped for Doppler shift pre-compensation, one or more component carriers that are configured for Doppler shift pre-compensation, or any combinations thereof.

In some cases, an indication of Doppler shift pre-compensation for the first uplink communication is determined based on a downlink reference signal that is received from one or more of the first transmission-reception point or the second transmission-reception point, and where the downlink reference signal is mapped to an indication of whether Doppler shift pre-compensation is to be applied for uplink communications associated with the downlink reference signal.

The uplink transmission manager 720 may transmit the first uplink communication to one or more of the first transmission-reception point or the second transmission-reception point based on the control information. In some cases, the first uplink communication includes one or more of a sounding reference signal, an uplink control channel communication, an uplink shared channel communication, an uplink random access channel communication, or any combinations thereof.

The frequency compensation manager 725 may receive, from one or more of the first transmission-reception point or the second transmission-reception point, configuration information that enables the UE to perform a carrier frequency offset compensation for at least the first uplink communication based on an estimation of Doppler shift associated with one or more of the first transmission-reception point or the second transmission-reception point. In some examples, the frequency compensation manager 725 may determine, based on the estimating, a first carrier frequency offset for the first transmission-reception point and a second carrier frequency offset for the second transmission-reception point, and where the first uplink communication is compensated based on the first carrier frequency offset and the second carrier frequency offset.

In some examples, the frequency compensation manager 725 may determine, based on the estimating, a single carrier frequency offset that is to be applied to the first uplink communication. In some cases, the single carrier frequency offset is determined based on one or more of an average doppler shift among at least the first transmission-reception point and the second transmission-reception point, or a linear estimation of weighted linear values for each transmission-reception point based on an associated downlink signal strength. In some cases, the first uplink communication is not modulated to compensate for an estimated Doppler shift associated with the first transmission-reception point or the second transmission-reception point.

In some cases, the first uplink communication includes an uplink reference signal that is not modulated to compensate for an estimated Doppler shift associated with the first transmission-reception point or the second transmission-reception point, and where one or more of an uplink control channel, uplink shared channel, or random access channel associated with the first uplink communication is compensated based on the estimated Doppler shift.

The Doppler shift estimator 730 may estimate a first Doppler shift associated with the first transmission-reception point and a second Doppler shift associated with the second transmission-reception point. In some examples, the Doppler shift estimator 730 may estimate a single Doppler shift associated with the first transmission-reception point and the second transmission-reception point.

The TCI manager 735 may configure a first transmission configuration indicator state associated with the first transmission-reception point, and a second transmission configuration indicator state associated with the second transmission-reception point based on the control information, and where the first uplink communication is transmitted based on the first transmission configuration indicator state and the second transmission configuration indicator state. In some examples, the TCI manager 735 may configure a single transmission configuration indicator state associated with both the first transmission-reception point and the second transmission-reception point based on the control information, and where the first uplink communication is transmitted based on the single transmission configuration indicator state.

The RRC manager 740 may communicate RRC signaling with a serving base station. In some cases, the control information is provided in RRC signaling that enables or disables Doppler shift pre-compensation for uplink communications.

Figure 8:
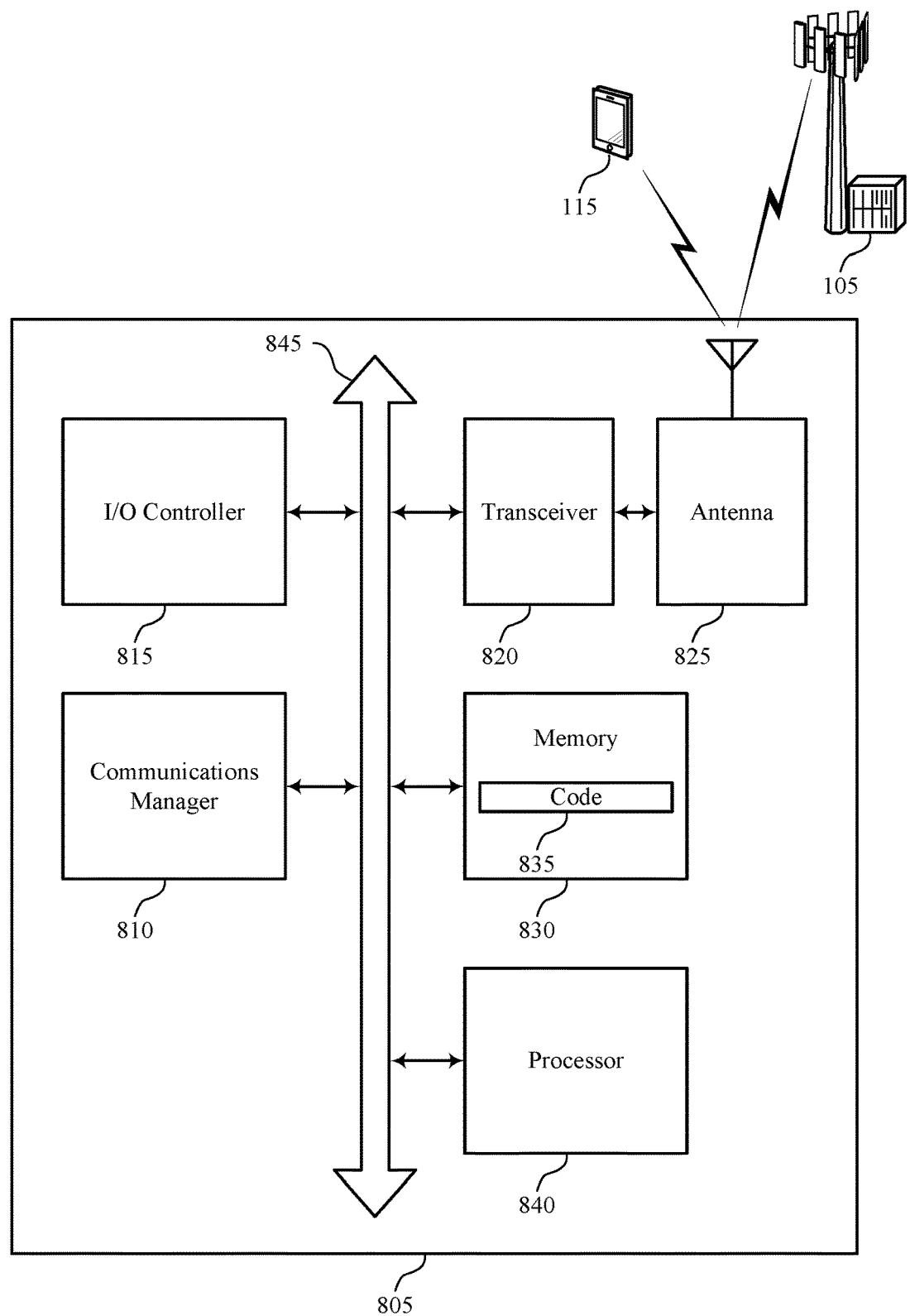
FIG. 8 shows a diagram of a system including a device that supports doppler compensation capability signaling in wireless communications in accordance with aspects of the present disclosure.

FIG. 8 shows a diagram of a system 800 including a device 805 that supports doppler compensation capability signaling in wireless communications in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may transmit a Doppler compensation capability indication to a first transmission-reception point of two or more transmission-reception points that are in communication with the UE, where the Doppler compensation capability indication signals one or more capabilities of the UE for Doppler pre-compensating one or more uplink communications to one or more of the first transmission-reception point or a second transmission-reception point, receive, from one or more of the first transmission-reception point or the second transmission-reception point, control information for at least a first uplink communication to be transmitted from the UE to one or more of the first transmission-reception point or the second transmission-reception point based on the Doppler compensation capability indication, and transmit the first uplink communication to one or more of the first transmission-reception point or the second transmission-reception point based on the control information.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting doppler compensation capability signaling in wireless communications).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
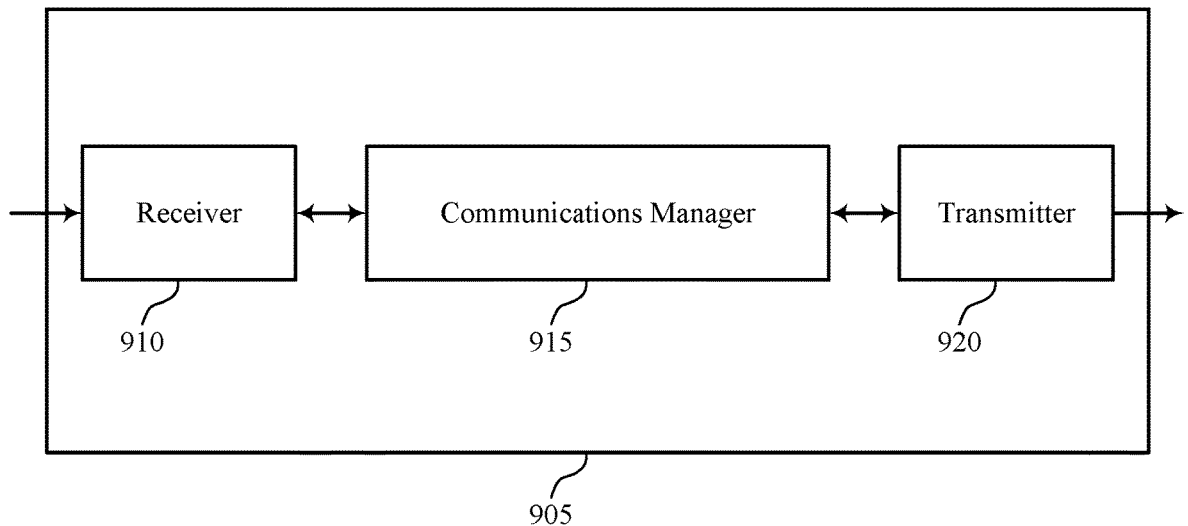
FIGS. 9 and 10 show block diagrams of devices that support doppler compensation capability signaling in wireless communications in accordance with aspects of the present disclosure.

FIG. 9 shows a block diagram 900 of a device 905 that supports doppler compensation capability signaling in wireless communications in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to doppler compensation capability signaling in wireless communications, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a UE, a Doppler compensation capability indication, where the Doppler compensation capability indication signals one or more capabilities of the UE for Doppler pre-compensating one or more uplink communications to one or more of the first transmission-reception point or a second transmission-reception point, transmit, to the UE, control information for at least a first uplink communication to be transmitted from the UE to one or more of the first transmission-reception point or the second transmission-reception point based on the Doppler compensation capability indication, and receive the first uplink communication from the UE based on the control information. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
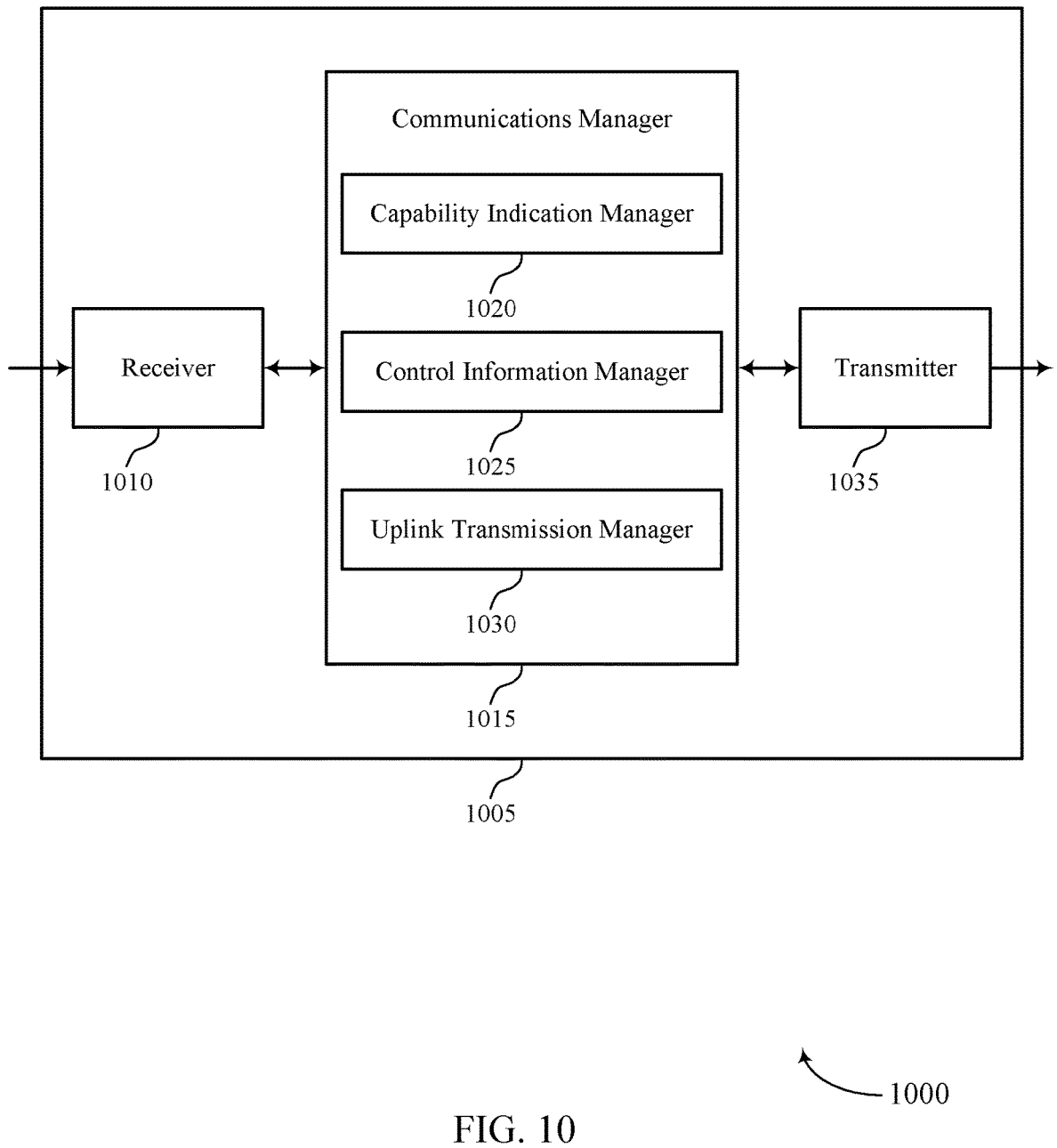

FIG. 10 shows a block diagram 1000 of a device 1005 that supports doppler compensation capability signaling in wireless communications in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to doppler compensation capability signaling in wireless communications, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a capability indication manager 1020, a control information manager 1025, and an uplink transmission manager 1030. The communications manager 1015 may be an example of aspects of the communications manager 1210 described herein.

The capability indication manager 1020 may receive, from a UE, a Doppler compensation capability indication, where the Doppler compensation capability indication signals one or more capabilities of the UE for Doppler pre-compensating one or more uplink communications to one or more of the first transmission-reception point or a second transmission-reception point.

The control information manager 1025 may transmit, to the UE, control information for at least a first uplink communication to be transmitted from the UE to one or more of the first transmission-reception point or the second transmission-reception point based on the Doppler compensation capability indication.

The uplink transmission manager 1030 may receive the first uplink communication from the UE based on the control information.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
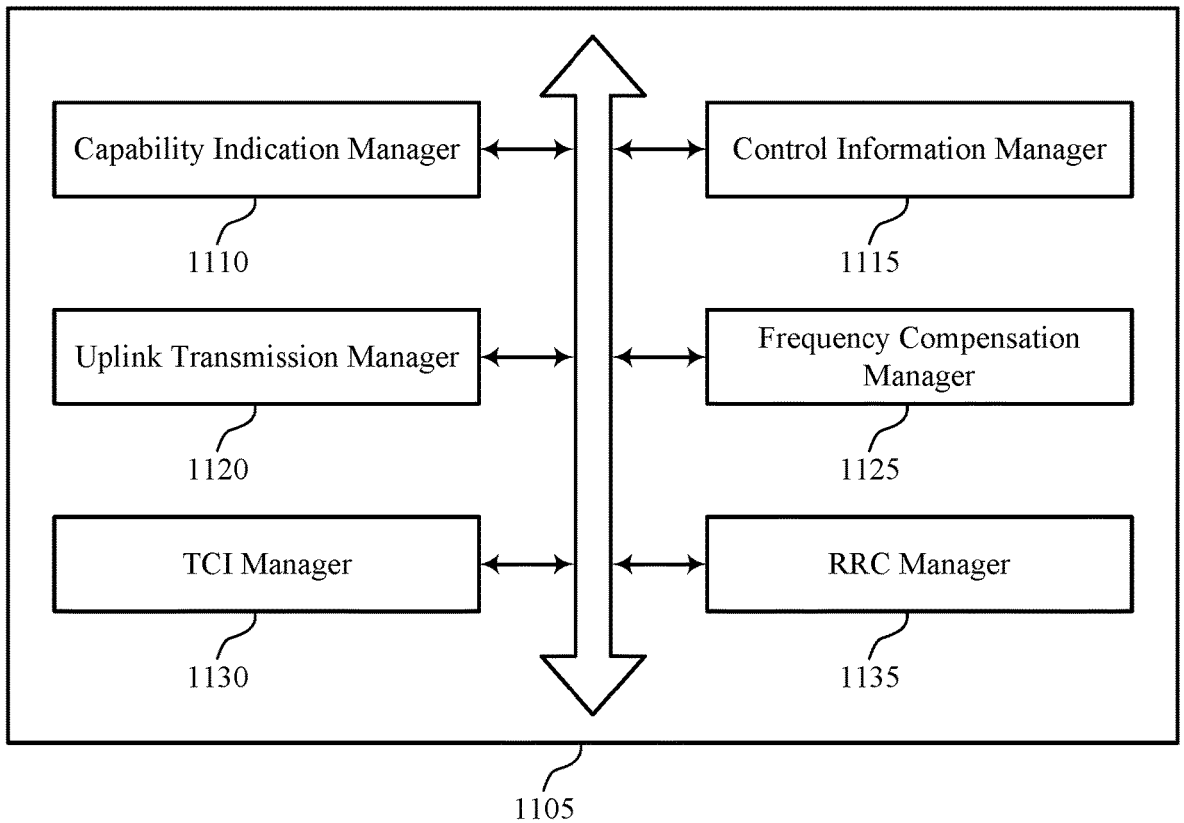
FIG. 11 shows a block diagram of a communications manager that supports doppler compensation capability signaling in wireless communications in accordance with aspects of the present disclosure.

FIG. 11 shows a block diagram 1100 of a communications manager 1105 that supports doppler compensation capability signaling in wireless communications in accordance with aspects of the present disclosure. The communications manager 1105 may be an example of aspects of a communications manager 915, a communications manager 1015, or a communications manager 1210 described herein. The communications manager 1105 may include a capability indication manager 1110, a control information manager 1115, an uplink transmission manager 1120, a frequency compensation manager 1125, a TCI manager 1130, and a RRC manager 1135. Each of these modules may communicate, directly or indirectly, with one another (e.g., via one or more buses).

The capability indication manager 1110 may receive, from a UE, a Doppler compensation capability indication, where the Doppler compensation capability indication signals one or more capabilities of the UE for Doppler pre-compensating one or more uplink communications to one or more of the first transmission-reception point or a second transmission-reception point. In some examples, the capability indication manager 1110 may receive, from the UE, one or more of a capability indication for Doppler pre-compensating one or more frequency bands, a capability indication for Doppler pre-compensating one or more combinations of frequency bands, a capability indication for Doppler pre-compensating one or more high band or low band frequency ranges, or any combinations thereof.

In some cases, the Doppler compensation capability indication indicates that the UE supports multiple concurrent Doppler pre-compensations for multiple transmission-reception points, a number of concurrent Doppler pre-compensations that are supported by the UE, whether the capability is per component carrier or across component carriers, or per band or across a band combination, or per UE, or any combinations thereof. In some cases, the Doppler compensation capability indication further indicates that the UE supports receiving multiple downlink reference signals from the multiple transmission-reception points that are associated with a same uplink reference signal.

In some cases, the Doppler compensation capability indication indicates that the UE supports a single Doppler pre-compensation for each uplink communication from the UE, and where a single carrier frequency offset is applied to the first uplink communication. In some cases, the Doppler compensation capability indication indicates that Doppler pre-compensation is unsupported by the UE.

The control information manager 1115 may transmit, to the UE, control information for at least a first uplink communication to be transmitted from the UE to one or more of the first transmission-reception point or the second transmission-reception point based on the Doppler compensation capability indication. In some cases, the control information indicates that the UE is to use multiple concurrent Doppler pre-compensations for the first uplink communication, a single Doppler pre-compensation for the first uplink communication, or that no Doppler pre-compensation is to be used for the first uplink communication. In some cases, the single Doppler pre-compensation for the first uplink communication is a default configuration when UE capability information for Doppler pre-compensation is not received. In some cases, the control information is provided in one or more of a downlink control information communication or a medium access control (MAC) control element enables or disables Doppler shift pre-compensation for at least the first uplink communication.

In some cases, the control information provides an indication of Doppler shift pre-compensation based on one or more of a SRS resource that is mapped to Doppler shift pre-compensation, a SRS resource set that is mapped for Doppler shift pre-compensation, an uplink shared channel configuration, an uplink control channel configuration, one or more uplink bandwidth parts that are mapped for Doppler shift pre-compensation, one or more component carriers that are configured for Doppler shift pre-compensation, or any combinations thereof. In some cases, an indication of Doppler shift pre-compensation for the first uplink communication is based on a downlink reference signal that is transmitted to the UE, and where the downlink reference signal is mapped to an indication of whether Doppler shift pre-compensation is to be applied for uplink communications associated with the downlink reference signal.

The uplink transmission manager 1120 may receive the first uplink communication from the UE based on the control information. In some cases, the first uplink communication includes one or more of a sounding reference signal, an uplink control channel communication, an uplink shared channel communication, an uplink random access channel communication, or any combinations thereof. In some cases, the first uplink communication includes an uplink reference signal that is not modulated to compensate for an estimated Doppler shift associated with the first transmission-reception point or the second transmission-reception point, and where one or more of an uplink control channel, uplink shared channel, or random access channel associated with the first uplink communication is compensated based on the estimated Doppler shift.

The frequency compensation manager 1125 may transmit configuration information that enables the UE to perform a carrier frequency offset compensation for at least the first uplink communication based on an estimation of Doppler shift associated with one or more of the first transmission-reception point or the second transmission-reception point. In some cases, the single carrier frequency offset is determined based on one or more of an average doppler shift among at least the first transmission-reception point and the second transmission-reception point, or a linear estimation of weighted linear values for each transmission-reception point based on an associated downlink signal strength. In some cases, the first uplink communication is not modulated to compensate for an estimated Doppler shift associated with the first transmission-reception point or the second transmission-reception point.

The TCI manager 1130 may determine one or more TCI states for communications. In some cases, the control information further indicates a first transmission configuration indicator state associated with the first transmission-reception point and a second transmission configuration indicator state associated with the second transmission-reception point, and where the first uplink communication is received at the first transmission-reception point based on the first transmission configuration indicator state. In some cases, the control information further indicates a single transmission configuration indicator state associated with both the first transmission-reception point and the second transmission-reception point.

The RRC manager 1135 may communicate RRC configuration information with the UE. In some cases, the control information is provided in RRC signaling that enables or disables Doppler shift pre-compensation for uplink communications.

Figure 12:
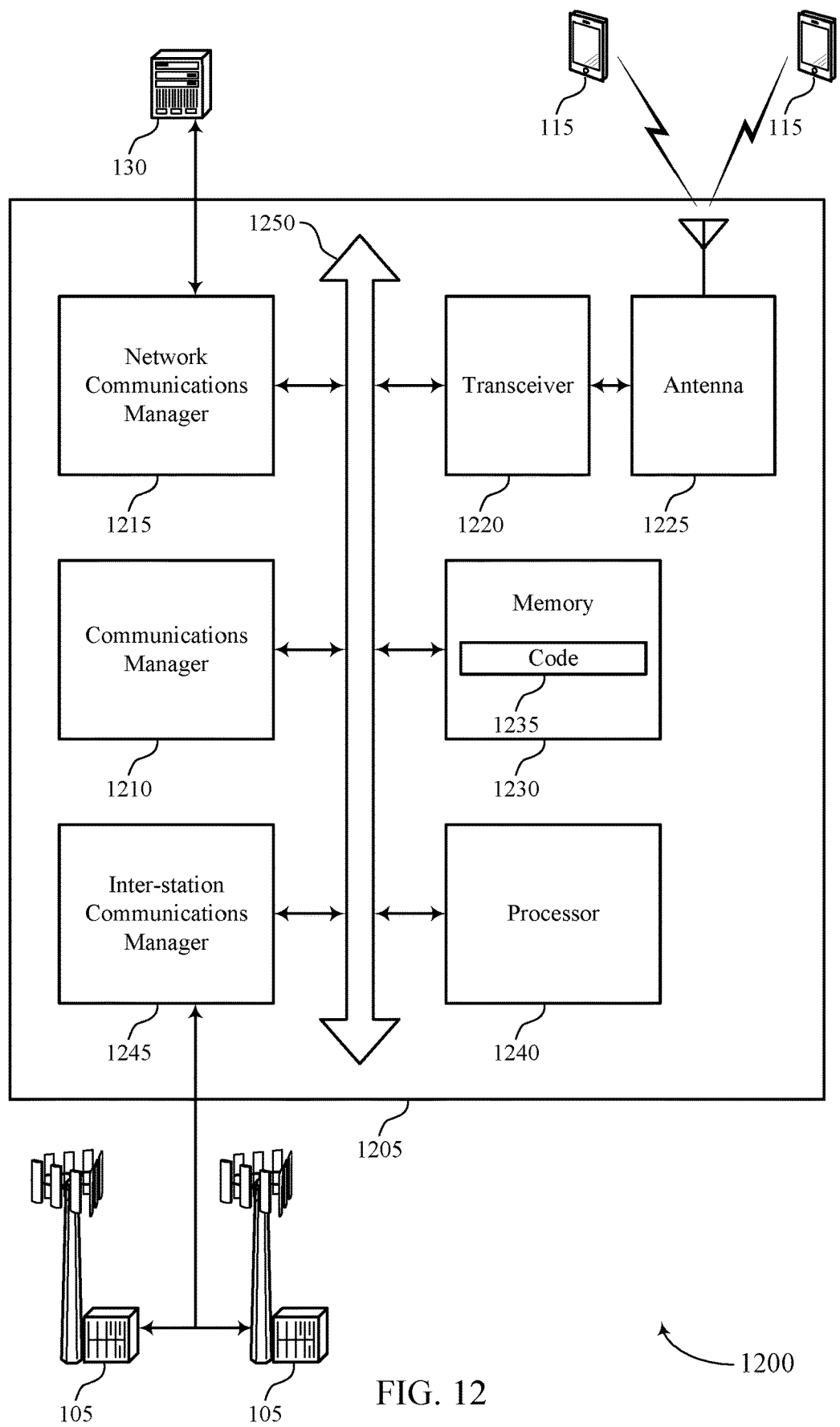
FIG. 12 shows a diagram of a system including a device that supports doppler compensation capability signaling in wireless communications in accordance with aspects of the present disclosure.

FIG. 12 shows a diagram of a system 1200 including a device 1205 that supports doppler compensation capability signaling in wireless communications in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive, from a UE, a Doppler compensation capability indication, where the Doppler compensation capability indication signals one or more capabilities of the UE for Doppler pre-compensating one or more uplink communications to one or more of the first transmission-reception point or a second transmission-reception point, transmit, to the UE, control information for at least a first uplink communication to be transmitted from the UE to one or more of the first transmission-reception point or the second transmission-reception point based on the Doppler compensation capability indication, and receive the first uplink communication from the UE based on the control information.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting doppler compensation capability signaling in wireless communications).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
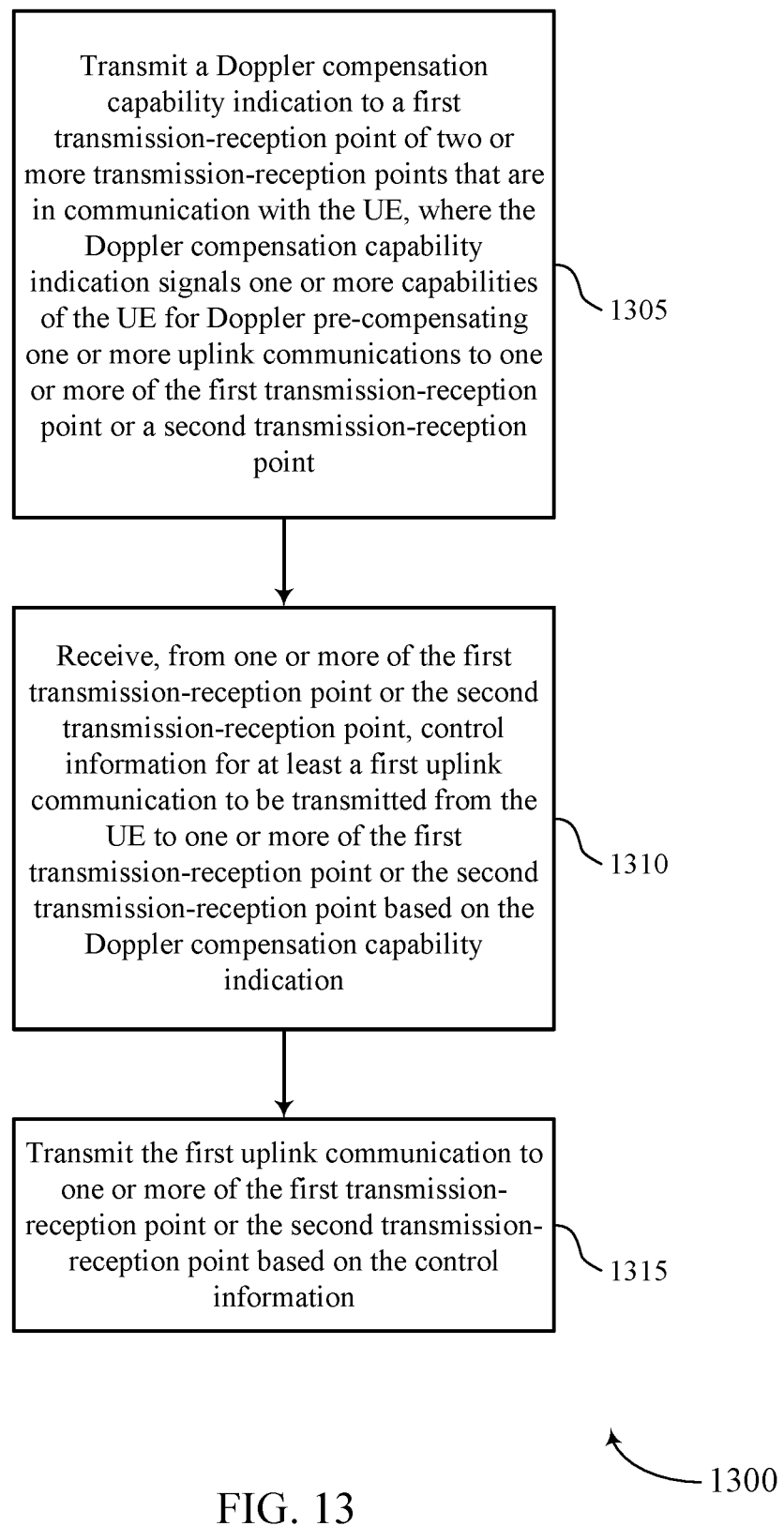
FIGS. 13 through 18 show flowcharts illustrating methods that support doppler compensation capability signaling in wireless communications in accordance with aspects of the present disclosure.

FIG. 13 shows a flowchart illustrating a method 1300 that supports doppler compensation capability signaling in wireless communications in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may transmit a Doppler compensation capability indication to a first transmission-reception point of two or more transmission-reception points that are in communication with the UE, where the Doppler compensation capability indication signals one or more capabilities of the UE for Doppler pre-compensating one or more uplink communications to one or more of the first transmission-reception point or a second transmission-reception point. The operations of 1305 may be performed according to the methods described herein. In some examples, aspects of the operations of 1305 may be performed by a capability indication manager as described with reference to FIGS. 5 through 8.

At 1310, the UE may receive, from one or more of the first transmission-reception point or the second transmission-reception point, control information for at least a first uplink communication to be transmitted from the UE to one or more of the first transmission-reception point or the second transmission-reception point based on the Doppler compensation capability indication. The operations of 1310 may be performed according to the methods described herein. In some examples, aspects of the operations of 1310 may be performed by a control information manager as described with reference to FIGS. 5 through 8.

At 1315, the UE may transmit the first uplink communication to one or more of the first transmission-reception point or the second transmission-reception point based on the control information. The operations of 1315 may be performed according to the methods described herein. In some examples, aspects of the operations of 1315 may be performed by an uplink transmission manager as described with reference to FIGS. 5 through 8.

Figure 14:
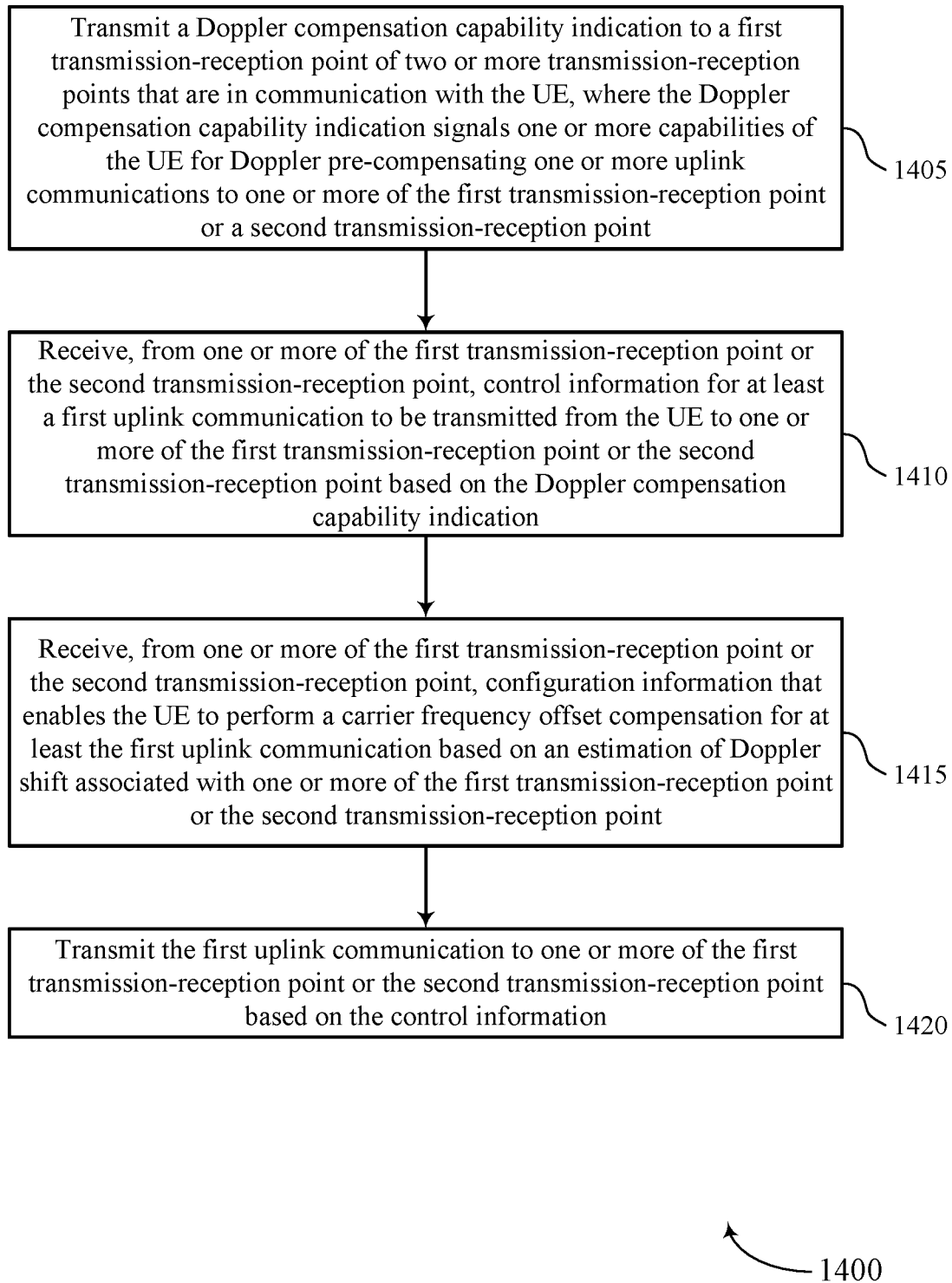

FIG. 14 shows a flowchart illustrating a method 1400 that supports doppler compensation capability signaling in wireless communications in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may transmit a Doppler compensation capability indication to a first transmission-reception point of two or more transmission-reception points that are in communication with the UE, where the Doppler compensation capability indication signals one or more capabilities of the UE for Doppler pre-compensating one or more uplink communications to one or more of the first transmission-reception point or a second transmission-reception point. The operations of 1405 may be performed according to the methods described herein. In some examples, aspects of the operations of 1405 may be performed by a capability indication manager as described with reference to FIGS. 5 through 8.

At 1410, the UE may receive, from one or more of the first transmission-reception point or the second transmission-reception point, control information for at least a first uplink communication to be transmitted from the UE to one or more of the first transmission-reception point or the second transmission-reception point based on the Doppler compensation capability indication. The operations of 1410 may be performed according to the methods described herein. In some examples, aspects of the operations of 1410 may be performed by a control information manager as described with reference to FIGS. 5 through 8.

At 1415, the UE may receive, from one or more of the first transmission-reception point or the second transmission-reception point, configuration information that enables the UE to perform a carrier frequency offset compensation for at least the first uplink communication based on an estimation of Doppler shift associated with one or more of the first transmission-reception point or the second transmission-reception point. The operations of 1415 may be performed according to the methods described herein. In some examples, aspects of the operations of 1415 may be performed by a frequency compensation manager as described with reference to FIGS. 5 through 8.

At 1420, the UE may transmit the first uplink communication to one or more of the first transmission-reception point or the second transmission-reception point based on the control information. The operations of 1420 may be performed according to the methods described herein. In some examples, aspects of the operations of 1420 may be performed by an uplink transmission manager as described with reference to FIGS. 5 through 8.

Figure 15:
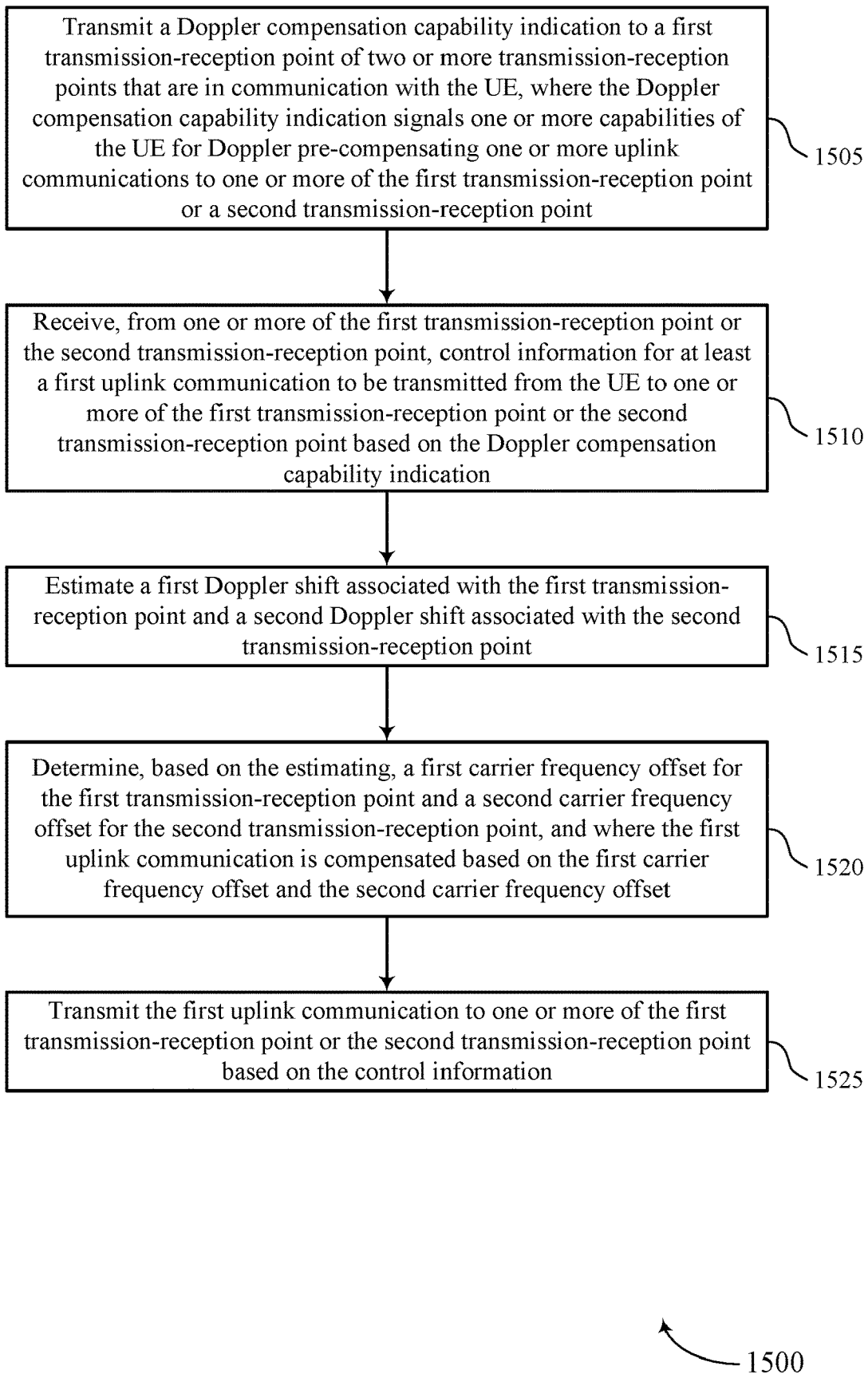

FIG. 15 shows a flowchart illustrating a method 1500 that supports doppler compensation capability signaling in wireless communications in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may transmit a Doppler compensation capability indication to a first transmission-reception point of two or more transmission-reception points that are in communication with the UE, where the Doppler compensation capability indication signals one or more capabilities of the UE for Doppler pre-compensating one or more uplink communications to one or more of the first transmission-reception point or a second transmission-reception point. The operations of 1505 may be performed according to the methods described herein. In some examples, aspects of the operations of 1505 may be performed by a capability indication manager as described with reference to FIGS. 5 through 8. In some cases, the Doppler compensation capability indication indicates that the UE supports multiple concurrent Doppler pre-compensations for multiple transmission-reception points, a number of concurrent Doppler pre-compensations that are supported by the UE, whether the capability is per component carrier or across component carriers, or per band or across a band combination, or per UE, or any combinations thereof.

At 1510, the UE may receive, from one or more of the first transmission-reception point or the second transmission-reception point, control information for at least a first uplink communication to be transmitted from the UE to one or more of the first transmission-reception point or the second transmission-reception point based on the Doppler compensation capability indication. The operations of 1510 may be performed according to the methods described herein. In some examples, aspects of the operations of 1510 may be performed by a control information manager as described with reference to FIGS. 5 through 8.

At 1515, the UE may estimate a first Doppler shift associated with the first transmission-reception point and a second Doppler shift associated with the second transmission-reception point. The operations of 1515 may be performed according to the methods described herein. In some examples, aspects of the operations of 1515 may be performed by a Doppler shift estimator as described with reference to FIGS. 5 through 8.

At 1520, the UE may determine, based on the estimating, a first carrier frequency offset for the first transmission-reception point and a second carrier frequency offset for the second transmission-reception point, and where the first uplink communication is compensated based on the first carrier frequency offset and the second carrier frequency offset. The operations of 1520 may be performed according to the methods described herein. In some examples, aspects of the operations of 1520 may be performed by a frequency compensation manager as described with reference to FIGS. 5 through 8.

At 1525, the UE may transmit the first uplink communication to one or more of the first transmission-reception point or the second transmission-reception point based on the control information. The operations of 1525 may be performed according to the methods described herein. In some examples, aspects of the operations of 1525 may be performed by an uplink transmission manager as described with reference to FIGS. 5 through 8.

Figure 16:
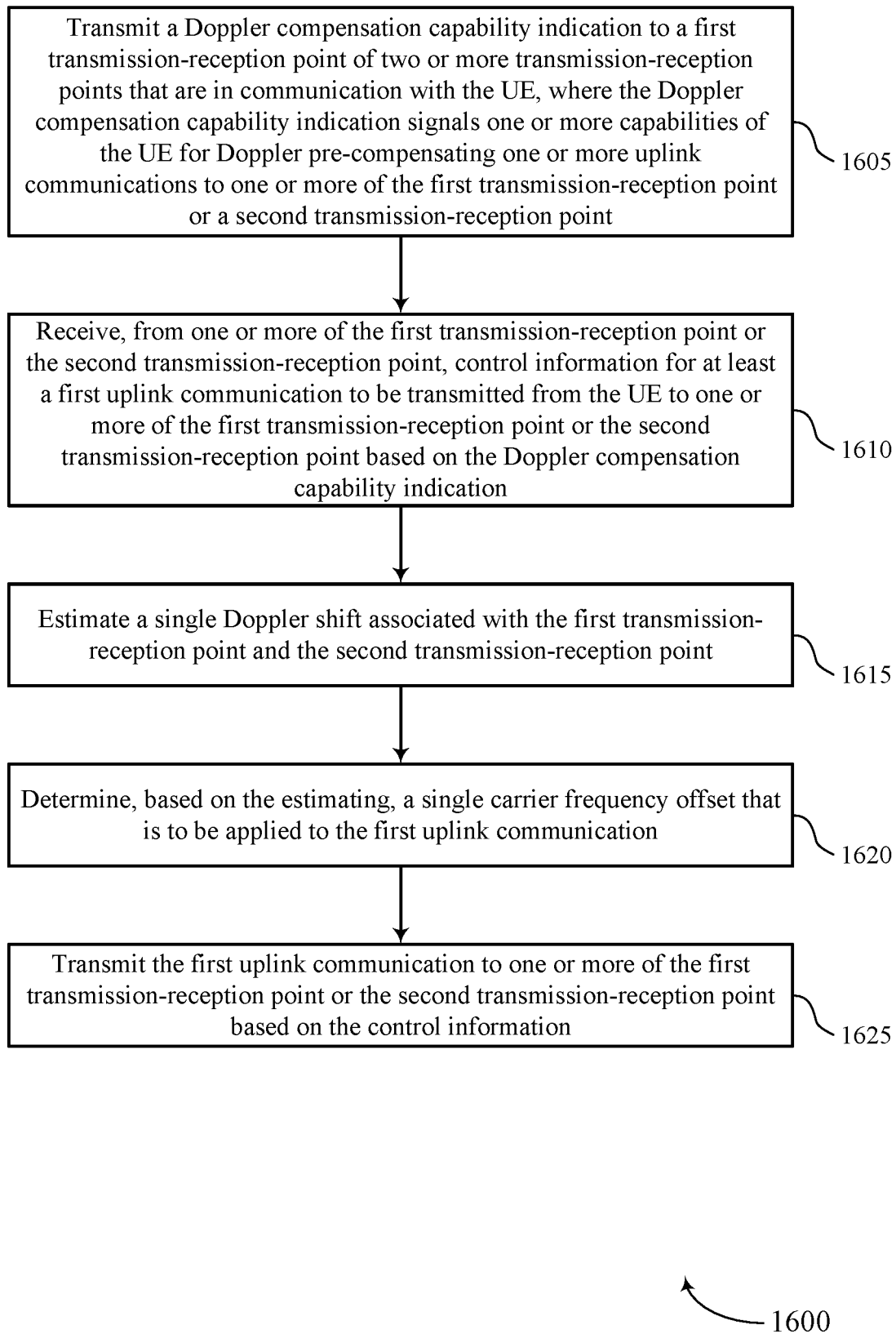

FIG. 16 shows a flowchart illustrating a method 1600 that supports doppler compensation capability signaling in wireless communications in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below.

Additionally or alternatively, a UE may perform aspects of the functions described below using special-purpose hardware.

At 1605, the UE may transmit a Doppler compensation capability indication to a first transmission-reception point of two or more transmission-reception points that are in communication with the UE, where the Doppler compensation capability indication signals one or more capabilities of the UE for Doppler pre-compensating one or more uplink communications to one or more of the first transmission-reception point or a second transmission-reception point. The operations of 1605 may be performed according to the methods described herein. In some examples, aspects of the operations of 1605 may be performed by a capability indication manager as described with reference to FIGS. 5 through 8. In some cases, the Doppler compensation capability indication indicates that the UE supports a single Doppler pre-compensation for each uplink communication from the UE.

At 1610, the UE may receive, from one or more of the first transmission-reception point or the second transmission-reception point, control information for at least a first uplink communication to be transmitted from the UE to one or more of the first transmission-reception point or the second transmission-reception point based on the Doppler compensation capability indication. The operations of 1610 may be performed according to the methods described herein. In some examples, aspects of the operations of 1610 may be performed by a control information manager as described with reference to FIGS. 5 through 8.

At 1615, the UE may estimate a single Doppler shift associated with the first transmission-reception point and the second transmission-reception point. The operations of 1615 may be performed according to the methods described herein. In some examples, aspects of the operations of 1615 may be performed by a Doppler shift estimator as described with reference to FIGS. 5 through 8.

At 1620, the UE may determine, based on the estimating, a single carrier frequency offset that is to be applied to the first uplink communication. The operations of 1620 may be performed according to the methods described herein. In some examples, aspects of the operations of 1620 may be performed by a frequency compensation manager as described with reference to FIGS. 5 through 8.

At 1625, the UE may transmit the first uplink communication to one or more of the first transmission-reception point or the second transmission-reception point based on the control information. The operations of 1625 may be performed according to the methods described herein. In some examples, aspects of the operations of 1625 may be performed by an uplink transmission manager as described with reference to FIGS. 5 through 8.

Figure 17:
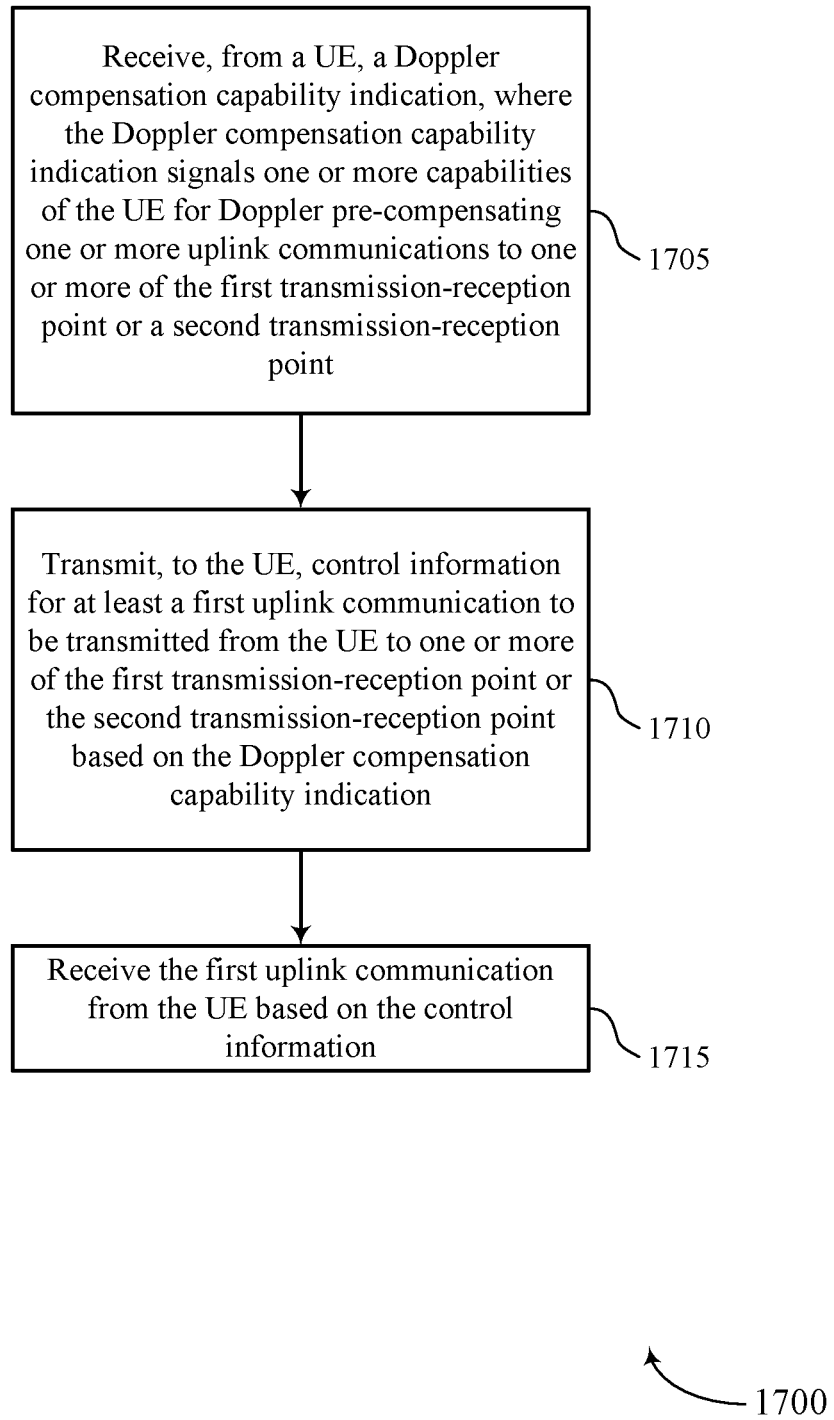

FIG. 17 shows a flowchart illustrating a method 1700 that supports doppler compensation capability signaling in wireless communications in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may receive, from a UE, a Doppler compensation capability indication, where the Doppler compensation capability indication signals one or more capabilities of the UE for Doppler pre-compensating one or more uplink communications to one or more of the first transmission-reception point or a second transmission-reception point. The operations of 1705 may be performed according to the methods described herein. In some examples, aspects of the operations of 1705 may be performed by a capability indication manager as described with reference to FIGS. 9 through 12.

At 1710, the base station may transmit, to the UE, control information for at least a first uplink communication to be transmitted from the UE to one or more of the first transmission-reception point or the second transmission-reception point based on the Doppler compensation capability indication. The operations of 1710 may be performed according to the methods described herein. In some examples, aspects of the operations of 1710 may be performed by a control information manager as described with reference to FIGS. 9 through 12.

At 1715, the base station may receive the first uplink communication from the UE based on the control information. The operations of 1715 may be performed according to the methods described herein. In some examples, aspects of the operations of 1715 may be performed by an uplink transmission manager as described with reference to FIGS. 9 through 12.

Figure 18:
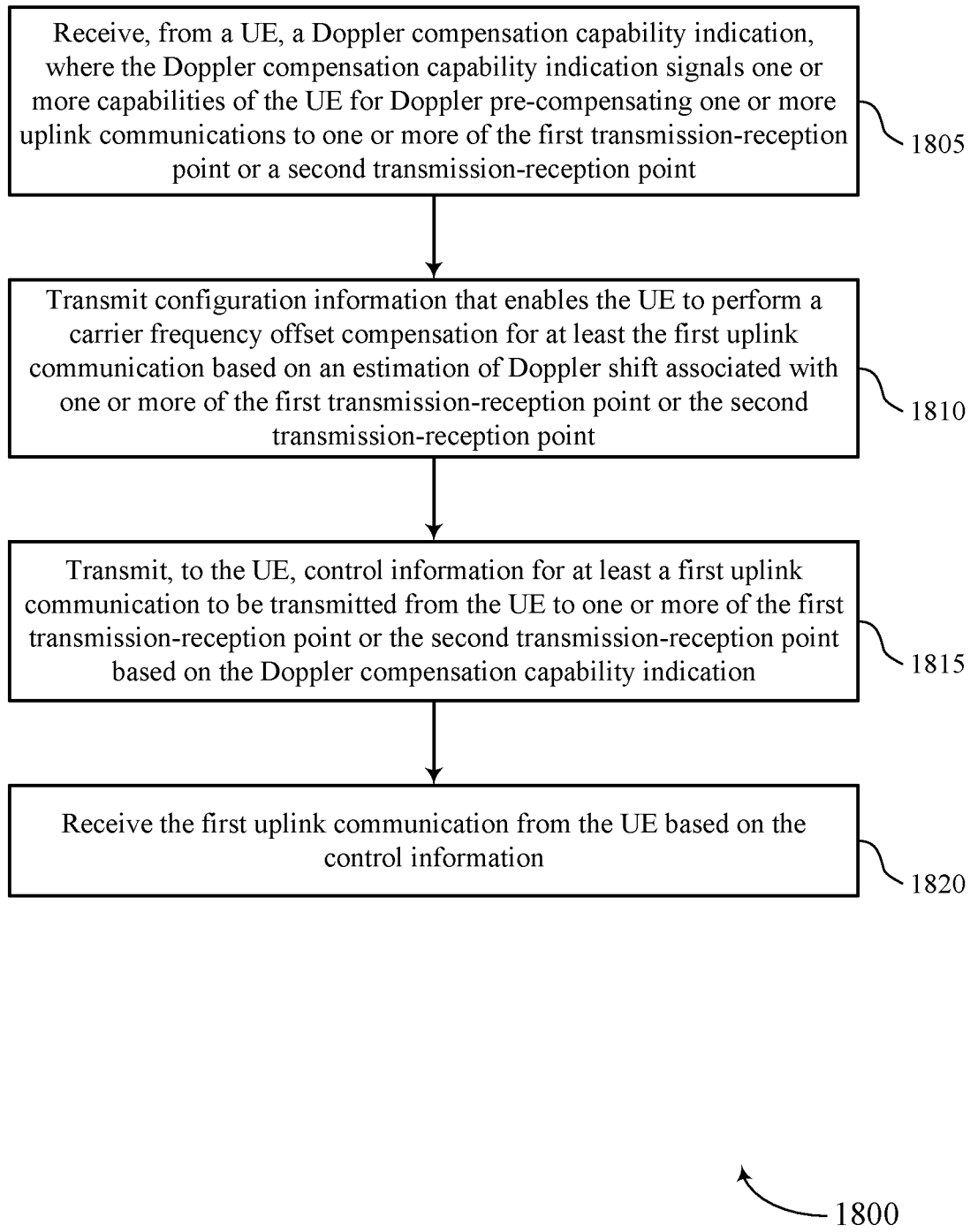

FIG. 18 shows a flowchart illustrating a method 1800 that supports doppler compensation capability signaling in wireless communications in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may receive, from a UE, a Doppler compensation capability indication, where the Doppler compensation capability indication signals one or more capabilities of the UE for Doppler pre-compensating one or more uplink communications to one or more of the first transmission-reception point or a second transmission-reception point. The operations of 1805 may be performed according to the methods described herein. In some examples, aspects of the operations of 1805 may be performed by a capability indication manager as described with reference to FIGS. 9 through 12.

At 1810, the base station may transmit configuration information that enables the UE to perform a carrier frequency offset compensation for at least the first uplink communication based on an estimation of Doppler shift associated with one or more of the first transmission-reception point or the second transmission-reception point. The operations of 1810 may be performed according to the methods described herein. In some examples, aspects of the operations of 1810 may be performed by a frequency compensation manager as described with reference to FIGS. 9 through 12.

At 1815, the base station may transmit, to the UE, control information for at least a first uplink communication to be transmitted from the UE to one or more of the first transmission-reception point or the second transmission-reception point based on the Doppler compensation capability indication. The operations of 1815 may be performed according to the methods described herein. In some examples, aspects of the operations of 1815 may be performed by a control information manager as described with reference to FIGS. 9 through 12.

At 1820, the base station may receive the first uplink communication from the UE based on the control information. The operations of 1820 may be performed according to the methods described herein. In some examples, aspects of the operations of 1820 may be performed by an uplink transmission manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   transmitting a Doppler compensation capability indication to at least a first transmission-reception point of two or more transmission-reception points that are in communication with the UE, wherein the Doppler compensation capability indication signals one or more capabilities of the UE for Doppler pre-compensating one or more uplink communications to one or more of the first transmission-reception point or a second transmission-reception point;
   receiving, from one or more of the first transmission-reception point or the second transmission-reception point, control information for at least a first uplink communication to be transmitted from the UE to one or more of the first transmission-reception point or the second transmission-reception point based at least in part on the Doppler compensation capability indication; and
   transmitting the first uplink communication to one or more of the first transmission-reception point or the second transmission-reception point based at least in part on the control information.

2. The method of claim 1, wherein the receiving the control information further comprises:
   receiving, from one or more of the first transmission-reception point or the second transmission-reception point, configuration information that enables the UE to perform a carrier frequency offset compensation for at least the first uplink communication based at least in part on an estimation of Doppler shift associated with one or more of the first transmission-reception point or the second transmission-reception point.

3. The method of claim 1, wherein the transmitting the Doppler compensation capability indication comprises:
   transmitting one or more of a capability indication for Doppler pre-compensating one or more frequency bands, a capability indication for Doppler pre-compensating one or more combinations of frequency bands, a capability indication for Doppler pre-compensating one or more high band or low band frequency ranges, or any combinations thereof.

4. The method of claim 1, wherein the Doppler compensation capability indication indicates that the UE supports multiple concurrent Doppler pre-compensations for multiple transmission-reception points, a number of concurrent Doppler pre-compensations that are supported by the UE, whether the capability is per component carrier or across component carriers, or per band or across a band combination, or per UE, or any combinations thereof.

5. The method of claim 4, further comprising:
   estimating a first Doppler shift associated with the first transmission-reception point and a second Doppler shift associated with the second transmission-reception point; and
   determining, based at least in part on the estimating, a first carrier frequency offset for the first transmission-reception point and a second carrier frequency offset for the second transmission-reception point, and wherein the first uplink communication is compensated based at least in part on the first carrier frequency offset and the second carrier frequency offset.

6. The method of claim 4, wherein the Doppler compensation capability indication further indicates that the UE supports receiving multiple downlink reference signals from the multiple transmission-reception points that are associated with a same uplink reference signal.

7. The method of claim 4, wherein the first uplink communication comprises one or more of a sounding reference signal, an uplink control channel communication, an uplink shared channel communication, an uplink random access channel communication, or any combinations thereof.

8. The method of claim 4, further comprising:
   configuring a first transmission configuration indicator state associated with the first transmission-reception point, and a second transmission configuration indicator state associated with the second transmission-reception point based at least in part on the control information, and wherein the first uplink communication is transmitted based at least in part on the first transmission configuration indicator state and the second transmission configuration indicator state.

9. The method of claim 1, wherein the Doppler compensation capability indication indicates that the UE supports a single Doppler pre-compensation for each uplink communication from the UE.

10. The method of claim 9, further comprising:
    estimating a single Doppler shift associated with the first transmission-reception point and the second transmission-reception point; and
    determining, based at least in part on the estimating, a single carrier frequency offset that is to be applied to the first uplink communication.

11. The method of claim 10, wherein the single carrier frequency offset is determined based at least in part on one or more of an average doppler shift among at least the first transmission-reception point and the second transmission-reception point, or a linear estimation of weighted linear values for each transmission-reception point based on an associated downlink signal strength.

12. The method of claim 9, further comprising:
    configuring a single transmission configuration indicator state associated with both the first transmission-reception point and the second transmission-reception point based at least in part on the control information, and wherein the first uplink communication is transmitted based at least in part on the single transmission configuration indicator state.

13. The method of claim 1, wherein the Doppler compensation capability indication indicates that Doppler pre-compensation is unsupported by the UE.

14. The method of claim 13, wherein the first uplink communication is not modulated to compensate for an estimated Doppler shift associated with the first transmission-reception point or the second transmission-reception point.

15. The method of claim 1, wherein the first uplink communication includes an uplink reference signal that is not modulated to compensate for an estimated Doppler shift associated with the first transmission-reception point or the second transmission-reception point, and wherein one or more of an uplink control channel, uplink shared channel, or random access channel associated with the first uplink communication is compensated based on the estimated Doppler shift.

16. The method of claim 1, wherein the control information indicates that the UE is to use multiple concurrent Doppler pre-compensations for the first uplink communication, a single Doppler pre-compensation for the first uplink communication, or that no Doppler pre-compensation is to be used for the first uplink communication.

17. The method of claim 1, wherein the control information is provided in radio resource control (RRC) signaling that enables or disables Doppler shift pre-compensation for uplink communications.

18. The method of claim 1, wherein the control information is provided in one or more of a downlink control information communication or a medium access control (MAC) control element enables or disables Doppler shift pre-compensation for at least the first uplink communication.

19. The method of claim 1, wherein the control information provides an indication of Doppler shift pre-compensation based at least in part on one or more of a sounding reference signal (SRS) resource that is mapped to Doppler shift pre-compensation, a SRS resource set that is mapped for Doppler shift pre-compensation, an uplink shared channel configuration, an uplink control channel configuration, one or more uplink bandwidth parts that are mapped for Doppler shift pre-compensation, one or more component carriers that are configured for Doppler shift pre-compensation, or any combinations thereof.

20. The method of claim 1, wherein an indication of Doppler shift pre-compensation for the first uplink communication is determined based at least in part on a downlink reference signal that is received from one or more of the first transmission-reception point or the second transmission-reception point, and wherein the downlink reference signal is mapped to an indication of whether Doppler shift pre-compensation is to be applied for uplink communications associated with the downlink reference signal.

21. A method for wireless communication at a first transmission-reception point, comprising:
receiving, from a user equipment (UE), a Doppler compensation capability indication, wherein the Doppler compensation capability indication signals one or more capabilities of the UE for Doppler pre-compensating one or more uplink communications to one or more of the first transmission-reception point or a second transmission-reception point;
transmitting, to the UE, control information for at least a first uplink communication to be transmitted from the UE to one or more of the first transmission-reception point or the second transmission-reception point based at least in part on the Doppler compensation capability indication; and
receiving the first uplink communication from the UE based at least in part on the control information.

22. The method of claim 21, wherein the transmitting the control information further comprises:
transmitting configuration information that enables the UE to perform a carrier frequency offset compensation for at least the first uplink communication based at least in part on an estimation of Doppler shift associated with one or more of the first transmission-reception point or the second transmission-reception point.

23. The method of claim 21, wherein the receiving the Doppler compensation capability indication comprises:
receiving, from the UE, one or more of a capability indication for Doppler pre-compensating one or more frequency bands, a capability indication for Doppler pre-compensating one or more combinations of frequency bands, a capability indication for Doppler pre-compensating one or more high band or low band frequency ranges, or any combinations thereof.

24. The method of claim 21, wherein the Doppler compensation capability indication indicates that the UE supports multiple concurrent Doppler pre-compensations for multiple transmission-reception points, a number of concurrent Doppler pre-compensations that are supported by the UE, whether the capability is per component carrier or across component carriers, or per band or across a band combination, or per UE, or any combinations thereof.

25. The method of claim 21, wherein the Doppler compensation capability indication indicates that the UE supports a single Doppler pre-compensation for each uplink communication from the UE, and wherein a single carrier frequency offset is applied to the first uplink communication.

26. The method of claim 21, wherein the first uplink communication includes an uplink reference signal that is not modulated to compensate for an estimated Doppler shift associated with the first transmission-reception point or the second transmission-reception point, and wherein one or more of an uplink control channel, uplink shared channel, or random access channel associated with the first uplink communication is compensated based on the estimated Doppler shift.

27. The method of claim 21, wherein the control information indicates that the UE is to use multiple concurrent Doppler pre-compensations for the first uplink communication, a single Doppler pre-compensation for the first uplink communication, or that no Doppler pre-compensation is to be used for the first uplink communication.

28. The method of claim 21, wherein the control information provides an indication of Doppler shift pre-compensation based at least in part on one or more of a sounding reference signal (SRS) resource that is mapped to Doppler shift pre-compensation, a SRS resource set that is mapped for Doppler shift pre-compensation, an uplink shared channel configuration, an uplink control channel configuration, one or more uplink bandwidth parts that are mapped for Doppler shift pre-compensation, one or more component carriers that are configured for Doppler shift pre-compensation, or any combinations thereof.

29. The method of claim 21, wherein an indication of Doppler shift pre-compensation for the first uplink communication is based at least in part on a downlink reference signal that is transmitted to the UE, and wherein the downlink reference signal is mapped to an indication of whether Doppler shift pre-compensation is to be applied for uplink communications associated with the downlink reference signal.

30. An apparatus for wireless communication at a user equipment (UE), comprising:
at least one processor,
memory coupled with the at least one processor; and
instructions stored in the memory and executable by the at least one processor to cause the apparatus to:
transmit a Doppler compensation capability indication to a first transmission-reception point of two or more transmission-reception points that are in communication with the UE, wherein the Doppler compensation capability indication signals one or more capabilities of the UE for Doppler pre-compensating one or more uplink communications to one or more of the first transmission-reception point or a second transmission-reception point;
receive, from one or more of the first transmission-reception point or the second transmission-reception point, control information for at least a first uplink communication to be transmitted from the UE to one or more of the first transmission-reception point or the second transmission-reception point based at least in part on the Doppler compensation capability indication; and transmit the first uplink communication to one or more of the first transmission-reception point or the second transmission-reception point based at least in part on the control information.

31. The apparatus of claim 30, wherein the instructions are further executable by the at least one processor to cause the apparatus to:

receive, from one or more of the first transmission-reception point or the second transmission-reception point, configuration information that enables the UE to perform a carrier frequency offset compensation for at least the first uplink communication based at least in part on an estimation of Doppler shift associated with one or more of the first transmission-reception point or the second transmission-reception point.

32. The apparatus of claim 30, wherein the Doppler compensation capability indication indicates that the UE supports a single Doppler pre-compensation for each uplink communication from the UE.

33. An apparatus for wireless communication at a first transmission-reception point, comprising:

at least one processor, memory coupled with the at least one processor; and instructions stored in the memory and executable by the at least one processor to cause the apparatus to:

receive, from a user equipment (UE), a Doppler compensation capability indication, wherein the Doppler compensation capability indication signals one or more capabilities of the UE for Doppler pre-compensating one or more uplink communications to one or more of the first transmission-reception point or a second transmission-reception point;

transmit, to the UE, control information for at least a first uplink communication to be transmitted from the UE to one or more of the first transmission-reception point or the second transmission-reception point based at least in part on the Doppler compensation capability indication; and receive the first uplink communication from the UE based at least in part on the control information.

34. The apparatus of claim 33, wherein the Doppler compensation capability indication indicates that the UE supports a single Doppler pre-compensation for each uplink communication from the UE, and wherein a single carrier frequency offset is applied to the first uplink communication.

35. An apparatus for wireless communication at a user equipment (UE), comprising:

means for transmitting a Doppler compensation capability indication to a first transmission-reception point of two or more transmission-reception points that are in communication with the UE, wherein the Doppler compensation capability indication signals one or more capabilities of the UE for Doppler pre-compensating one or more uplink communications to one or more of the first transmission-reception point or a second transmission-reception point;

means for receiving, from one or more of the first transmission-reception point or the second transmission-reception point, control information for at least a first uplink communication to be transmitted from the UE to one or more of the first transmission-reception point or the second transmission-reception point based at least in part on the Doppler compensation capability indication; and means for transmitting the first uplink communication to one or more of the first transmission-reception point or the second transmission-reception point based at least in part on the control information.

* * * * *